United States Patent [19]

Harris

[11] Patent Number: 5,394,523

[45] Date of Patent: Feb. 28, 1995

[54] POLYMORPHIC GRAPHIC DEVICE

[75] Inventor: Jerry G. Harris, Sunnyvale, Calif.

[73] Assignee: Taligent, Inc., Cupertino, Calif.

[21] Appl. No.: 7,992

[22] Filed: Jan. 22, 1993

[51] Int. Cl.$^6$ .............................................. G06F 15/00
[52] U.S. Cl. .................................... 395/162; 395/131
[58] Field of Search ................................ 395/162–164,
395/600, 650, 131, 109; 364/200 MS File, 900
MS File; 345/22, 24, 133, 150, 156, 186

[56] References Cited

U.S. PATENT DOCUMENTS

| | | | |
|---|---|---|---|
| 3,658,427 | 4/1972 | DeCou | 356/152 |
| 3,881,605 | 5/1975 | Grossman | 414/730 |
| 4,082,188 | 4/1978 | Grimmell et al. | 209/880 |
| 4,635,208 | 1/1987 | Coleby et al. | 364/491 |
| 4,677,576 | 6/1987 | Berlin, Jr. et al. | 395/120 |
| 4,704,694 | 11/1987 | Czerniejewski | 364/513 |
| 4,742,356 | 5/1988 | Kuipers | 342/448 |
| 4,821,220 | 4/1989 | Duisberg | 364/578 |
| 4,885,717 | 12/1989 | Beck et al. | 364/900 |
| 4,891,630 | 1/1990 | Friedman et al. | 345/156 |
| 4,939,648 | 7/1990 | O'Neill et al. | 364/422 |
| 4,953,080 | 8/1990 | Dysart et al. | 364/200 |
| 5,041,992 | 8/1991 | Cunnigham et al. | 345/135 |
| 5,050,090 | 9/1991 | Golub et al. | 364/478 |
| 5,060,276 | 10/1991 | Morris et al | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,168,441 | 12/1992 | Onarheim et al. | 364/146 |
| 5,177,685 | 1/1993 | Davis et al. | 364/443 |
| 5,181,162 | 1/1993 | Smith et al. | 364/419 |
| 5,247,669 | 9/1993 | Abraham et al. | 395/600 |
| 5,265,206 | 11/1993 | Shackelford et al. | 395/200 |

OTHER PUBLICATIONS

Grady Booch, "Object Oriented Design with Applications" by The Benjamin/Cummings Publishing Co., Inc., 1991, pp. 39–49.

Rumbaugh et al, "Object–Oriented Modeling and Design", by Prentice Hall, Inc, 1991, pp. 61–62, 301–305.

Novatica, v.17(90), 1991, Spain, pp. 83–89 Navarro "Que Son La Herencia Y El Polimorfismo".

Computer Lanuage, v.7(10), Oct. 1990, US, pp. 49–67, Weeks "Classy Graphics: Encapsulating the Borland Graphics Interface".

Proceedings of the SPIE, v.1830, Nov. 16, 1992, US, pp. 284–295, Klein and Slusallek, "An Object-Oriented Framework for Curves and Surfaces".

*Primary Examiner*—Mark R. Powell
*Assistant Examiner*—Kee M. Tung
*Attorney, Agent, or Firm*—Keith Stephens

[57] ABSTRACT

A method and apparatus providing a polymorphic pixel buffer. An object-oriented system design provides a robust and extensible pixel specification which allows for new methods, data types, and operation to be added to a digital pixel representation and processing system.

30 Claims, 23 Drawing Sheets

Tonal Reproduction Curves (Each value ranges from 0..255)

TO FIG. 22B

Examples of transformations using a PixelStreamReader and/or a PixelStreamWriter

| | | | |
|---|---|---|---|
| THalftoneBitMapPixelBuffer | 1 | 1 bit Halftone Pixel | Halftoned Bilevel Output |
| TAlpha1PixelBuffer | 1 | 1 bit On/Off Opacity | Matte/Opacity/ROI Specification |
| TAlpha8PixelBuffer | 1 | 8 bit Opacity | Matte Opacity/ROI Specification |
| TBitMapPixelBuffer | 1 | 1 bit Black or White | Bilevel Output |
| TClut2PixelBuffer | 1 | 2 bit index into 4 color table | Table Animated or PsuedoColor |
| TClut4PixelBuffer | 1 | 4 bit index into 16 color table | Table Animated or PsuedoColor |
| TClut8PixelBuffer | 1 | 8 bit index into 256 color table | Table Animated or PsuedoColor |
| TSystemClut8PixelBuffer | 1 | 8 bit index into 256 color table | Default Taligent Fixed Colortable |
| TGray4PixelBuffer | 1 | 4 bits into 16 shades of Gray | Antialiased Fonts |
| TGray8PixelBuffer | 1 | 8 bits into 256 shades of Gray | Continuous Tone Monochrome Images |
| Tb1R5G5B5 PixelBuffer | 3 | 5 bits of Red, Green and Blue | Continuous Tone Color Images |
| TA1R5G5B5PixelBuffer | 4 | 1 bit Opacity—5 bits Red, Green, Blue | Irregularly Shaped RGB Images |
| Tb8R8G8B8PixelBuffer | 3 | 8 bits of Red, Green and Blue | Continous Tone RGB Color Images |
| TA8R8G8B8PixelBuffer | 4 | 8 bits of Opacity, Red, Green, Blue | Transparent/Irregularly Shaped RGB Images |
| TR8G8B8PixelBuffer | 3 | 8 bits of Red, Green and Blue | Continous Tone RGB Color Images |
| TAlpha8Gray8PixelBuffer | 2 | 8 bits of Opacity, Grayscale | Transparent/Irregularly Shaped Gray Images |
| TA8R8G8B8Z32PixelBuffer | 5 | 8 bit Red, Green, Blue - 32 bits Z | Transparent RGB Color Images W/Depth |
| TZ32PixelBuffer | 1 | 32 bits of Z or depth | Depth or Z buffer, HeightField |
| TL12A12B12PixelBuffer | 3 | 12 bits specifying LAB | Device Independent LAB Color Images |

FIG. 31

(EACH VALUE RANGES FROM 0..255 AND MAPS TO 0.-1.0)

(EACH VALUE RANGES FROM 0..255 AND MAPS TO 0.-1.0)

INDEX
(THE VALUE RANGES FROM 0..3)

FIG. 36

INDEX
(THE VALUE RANGES FROM 0..15)

FIG. 37

INDEX
(THE VALUE RANGES FROM 0..255)

FIG. 38

GRAY
(THE VALUE RANGES FROM 0..15 AND MAPS TO 0.-1.0)

GRAY
(THE VALUE RANGES FROM 0..255 AND MAPS TO 0.-1.0)

ALPHA
(THE VALUE RANGES FROM 0..255 AND MAPS TO 0.-1.0)

0
□
INDEX
(THE VALUE RANGES FROM 0..1)
FIG. 42
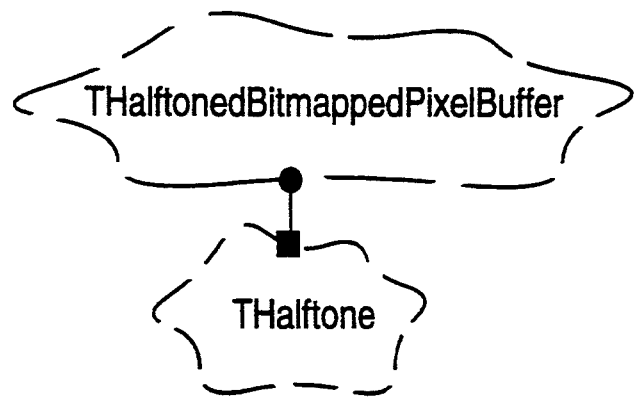
FIG. 43
0
□
ALPHA
(THE VALUE RANGES FROM 0..1 AND MAPS TO 0.-1.0)
FIG. 44
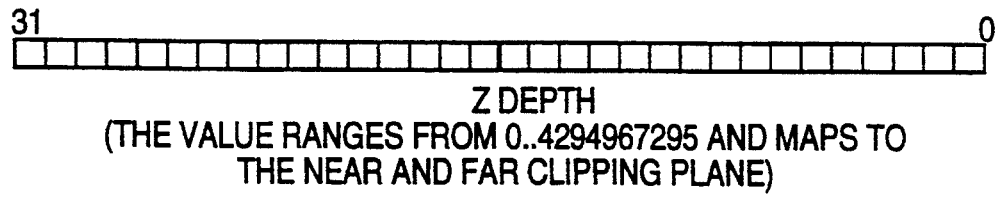
Z DEPTH
(THE VALUE RANGES FROM 0..4294967295 AND MAPS TO
THE NEAR AND FAR CLIPPING PLANE)
FIG. 45
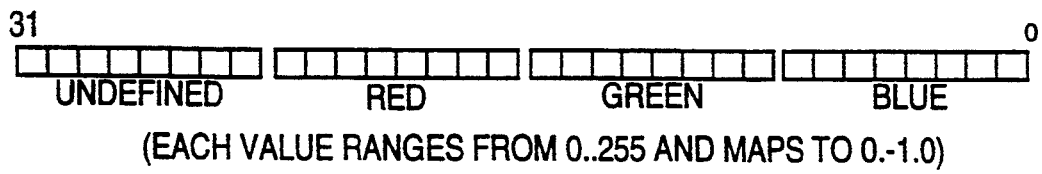
(EACH VALUE RANGES FROM 0..255 AND MAPS TO 0.-1.0)
FIG. 46

POLYMORPHIC GRAPHIC DEVICE

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

BACKGROUND OF THE INVENTION

1. Field of the Invention

The present invention relates generally to computer graphics and more particularly to polymorphic manipulation of pixel memory.

2. Summary of the Related Art

Computer pictures or images drawn on a computer screen are called computer graphics. Computer graphic systems store graphics internally in digital form. The picture is broken up into tiny picture elements or pixels. Thus a computer picture or graphic is actually an aggregation of individual picture elements or pixels. Internally, in the digital world of the computer, each pixel is assigned a set of digital values which represent the pixel's attributes. A pixel's attributes may describe its color, intensity and location, for example. Thus to change the color, intensity or location of a pixel, one simply changes the digital values for that particular attribute.

Conventional computer graphic systems utilize primitives known as images, bitmaps or pixel maps to represent computer imagery as a aggregation of pixels. These primitives represent a 2-dimensional array of pixel attributes and their respective digital values. Typically, such a primitive is expressed as a "struct" (data structure) that contains a pointer to pixel data, a pixel size, scanline size, bounds, and possibly a reference to a color table. Quite often, the pixels are assumed to represent Red, Green, and Blue (RGB) color, luminance, or indices into a color table. Thus, the primitive serves double duty as a framebuffer and as a frame storage specification.

The burgeoning computer graphics industry has settled on a defacto standard for pixel representation. All forms of images that do not fit into this standard are forced into second class citizenship. Conventional graphics systems, however, are nonextendable. They are usually dedicated to a particular application operating on a specific class of images. This is unacceptable in today's rapidly changing environment of digital technology. Every day seems to bring a new application, and with it the need to process and manipulate new image types in new ways. Thus, the use of a graphics system with a nonextensible graphic specification is not only short sighted, it is in a word, obsolete.

Graphical applications, attributes, and organizational requirements for pixel memory are diverse and expanding. Thus, dedicated single-purpose graphics system fail to meet current user's needs. There is a need for a robust graphic system that provides a dynamic environment and an extensible graphic specification that can expand to include new applications, new image types and provide for new pixel manipulations.

For example, two applications rarely require the same set of pixel attributes. 3-Dimensional applications store z values (depth ordering), while animation and paint systems store alpha values. Interactive material editors and 3-Dimensional paint programs store 3-Dimensional shading information, while video production systems may require YUV 4:2:2 pixel arrays. Hardware clippers store layer tags, and sophisticated systems may store object IDs for hit detection. Moreover, graphical attributes such as color spaces are amassing constant additions, such as PhotoYCC TM. Color matching technology is still evolving and it is yet unclear at to what quantized color space is best for recording the visible spectrum as pixels. Thus there is a variety of data types in the graphics world. There are also a variety of storage organization techniques.

To make matters even worse, it seems that every new application requires a different organization for the pixel memory. For example, Component Interleaved or "Chunky" scanline orientations are the prevailing organization in Macintosh ® video cards, but Component Interleaved banked switched memory is the trend in video cards targeted for hosts with small address spaces. Component planar tiles and component interleaved tiles are the trend in prepress and electronic paint programs, but output and input devices which print or scan in multiple passes prefer a component planar format. Multiresolution or pyramid formats are common for static images that require real-time resampling. Moreover, images that consume large amounts of memory may be represented as compressed pixel data which can be encoded in a multitude of ways.

The variety and growth of graphic applications, data types and pixel memory manipulations is very large. There is a requirement for a multipurpose system that can handle all the known applications and expand to handle those applications that are yet unknown. A single program solution is impractical. Although it may handle every known requirement, it would be huge and unwieldy. However, if such a program is downsized, it can no longer handle every application.

Alternatively, the functions can be separated into smaller programs. One can end up with an undesirable number of individual programs following this technique. And how does one decide which function to place in a given program. Which program should contain the requirements for user one? How about user two? Thus, there is a need for a general purpose program that suits the needs of many users, but allows the individual user to customize and add to the general purpose program so that it meets her particular need.

SUMMARY OF THE INVENTION

An object-oriented system is well suited to address the problems encountered in conventional systems. Object-oriented designs can provide a general purpose program that suits the needs of many users, but allows the individual user to customize and add to the general purpose program so that it meets his particular needs. In general, an object may be characterized by a number of operations and a state which remembers the effect of these operations.

The object-oriented operating system comprises a number of objects that are clearly delimited parts or functions of the system. Each object contains information about itself and a set of operations that it can perform on its information or information passed to it. For example, an object could be named MAN. The information contained in the object MAN, or its attributes might be age, address, and occupation etc. These attributes describe the object MAN. The object also contains a set of operations that it can perform on the information it contains. Thus, MAN might be able to perform an operation to change his occupation from a doctor to a lawyer.

Objects interact by sending messages to each other. These messages stimulate the receiving object to take some action, that is, perform one or more of the operations it contains. In the present invention there are many communicating objects. Some of the objects have common characteristics and are grouped together into a class. A class is a template that enables the creation of new objects that contain the same information and operations as other members of the same class.

An object created from a certain class is called an instance of that class. The class defines the operations and information initially contained in an instance, while the current state of the instance is defined by the operations performed on the instance. Thus, while all instances of a given class are created equal, subsequent operations can make each instance a unique object, unlike its brothers and sisters derived from the same parent class.

Polymorphism means that the sender of a stimulus or message does not need to know the receiving instance's class. The sender need only know that the receiver can perform a certain operation, without regard to which object performs the operation or what class to which it belongs.

Instances inherit the attributes of their class. Thus by modifying the attribute of a parent class, the attributes of the various instances are modified as well. The changes are inherited by the subclasses. New classes can be created by describing modifications to existing classes. The new class inherits the attributes of its class and the user can add anything which is unique to the new class. Thus, one can define a class by simply stating how the new class or object differs from its parent class or object. Classes that fall below another class in the inheritance hierarchy are called descendants or children of the parent class from which they descend and inherit.

In the polymorphic environment, the receiving object is responsible for determining which operation to perform upon receiving a stimulus message. An operation is a function or transformation that may be applied to or by objects in a class. Thus the stimulating object needs to know very little about the receiving object, simplifying execution of operations. Each object need only know how to perform his own operations, and who to call to perform those operations he cannot perform.

When the same operation may apply to many different classes, it is a polymorphic operation. The same operation takes on a different forms in the different classes. A method is the implementation of a particular operation for a given class. For example, the class Document may contain an operation called Read. Depending on the data type of the document, for example, ASCII versus BINARY, a different method might be used to perform the Read operation. Thus while both methods logically perform the same task, Read, and are thus called by the same name, Read, they may in fact be different methods implemented by a different piece of executable code. While the operation Read may have methods in several classes, it maintains the same number and types of arguments, that is, its signature remains the same.

Thus, as an object-oriented design, the present invention provides a generic, general purpose graphics utility that meets the needs of many users by allowing each user to customize his particular version or instantiation of the general purpose utility to meets his own, possibly unique combination of requirements.

Users need a generic tool that they can all use, but which them to customize the general purpose program to meet their own particular needs. The present invention, provides an abstract base class, TPixelBuffer, which represents a rectangular array of pixels' attributes stored in memory as pixels. Satisfaction of any of the above named applications is provided by a TPixelBuffer subclass, instantiated with the particular attributes required by the particular application as a user or client.

Subclasses allow a user to tailor the general purpose program to meet his needs. It allows for different quantization tradeoffs, different sets of pixel attributes, and different pixel memory organizations. Each subclass can encapsulates the knowledge of how to allocate, manage, stream, translate, and modify its own class of pixel data. All subsystems of the present invention use polymorphic access mechanisms, which enable the user to extend PixelBuffer types that can be rendered to or copied.

Fortunately, some commonalty exists among the various types of PixelBuffers. As it turns out, there are eight basic functions or categories that are necessary to satisfy the majority of client needs. Most clients want polymorphic management and the ability to specify the relationship between discrete and continuous space. Clients want to characterize color capabilities for use in accurate color reproduction. Clients want mechanisms for pixel memory alteration in the form of Get and SetPixel, Specialized "blit loops" tailored for scan converting clients, BitBlt, and CopyImage. Clients want mechanisms to supply clients with variants of 4b which match a key formed from the combination of client supplied attributes. Clients want the ability to perform polymorphic queries regarding traits or stored attributes. Clients want mechanisms which allow clients to polymorphically create, maintain, and query PixelBuffer caches. And finally clients want mechanisms which allow clients to polymorphically create, and maintain correlated backbuffers.

Thus it is an object of the present invention to provide a method and apparatus which provides for polymorphic pixel management. It is another object of the present invention to provide a method and apparatus which enables a user to specify the relationship between discrete and continuous space. It is another object of the present invention to provide a method and apparatus which enables a user to characterize color capabilities for use in accurate color reproduction. It is another object of the present invention to provide a method and apparatus which provides mechanisms for pixel memory alteration in the form of Get and SetPixel, Specialized "blitloops" tailored for scan converting clients, BitBlt, and CopyImage.

It is another object of the present invention to provide a method and apparatus which provides mechanisms which supply clients with variants of 4b which match a key formed from the combination of client supplied attributes. It is another object of the present invention to provide a method and apparatus which provides polymorphic queries regarding traits or stored attributes. It is another object of the present invention to provide a method and apparatus which provides mechanisms which allow clients to polymorphically create, maintain, and query PixelBuffer caches. It is another object of the present invention to provide a method and apparatus which provides polymorphic queries regarding traits or stored attributes. It is another object of the present invention to provide a method and apparatus which provides mechanisms which allow clients to polymorphically create, and maintain correlated backbuffers.

It is another object of the present invention to provide a method and apparatus that provides for polymorphic access and manipulation of pixel memory. It is another object of the present invention to provide a method and apparatus which provides an extensible digital graphics environment which supports new image types. It is another object of the present invention to provide a method and apparatus which provides a digital graphics environment which supports a given image type which is extensible to add rendering support for a new transfer mode, a new TPaint, or a new dithering technique. It is another object of the present invention to provide a method and apparatus which provides an extensible digital graphics environment which provides a general purpose solution to satisfy the pixel manipulation needs of image editors, temporal/spatial image compression techniques, image acquisition device drivers, and image output device drivers.

It is another object of the present invention to provide a method and apparatus which provides an extensible digital graphics environment which provides for altering the geometric image transformation behavior. It is another object of the present invention to provide a method and apparatus which provides an extensible digital graphics environment which provides for implementing accelerated image transformations, or "blitloops".

BRIEF DESCRIPTION OF THE DRAWINGS

FIG. 31 is a illustrative example of the preferred PixelBuffer components and usage for the present invention.

FIG. 36 is a illustrative example of the preferred TClut2PixelBuffer for the present invention.

FIG. 37 is a illustrative example of the preferred TClut4PixelBuffer for the present invention.

FIG. 38 is a illustrative example of the preferred TClut8PixelBuffer for the present invention.

FIG. 42 a illustrative example of the preferred TBitmappedPixelBuffer for the present invention.

FIG. 43 is a illustrative example of the preferred THalftonedBitmappedPixelBuffer for the present invention.

FIG. 44 is a illustrative example of the preferred TAlpha1PixelBuffer for the present invention.

FIG. 45 a illustrative example of the preferred TB8R8G8B8PixelBuffer for the present invention.

FIG. 46 is a illustrative example of the preferred TZ32PixelBuffer for the present invention.

The invention will be further clarified by a consideration of the following detailed description and examples in conjunction with the drawings, which are intended to be purely exemplary of the method and apparatus of the present invention.

DETAILED DESCRIPTION OF THE PREFERRED EMBODIMENT OF THE INVENTION

The present invention comprises a group of objects created in an object-oriented software platform comprised of an operating system and a development environment.

The Preferred Hardware Environment

Figure 1:
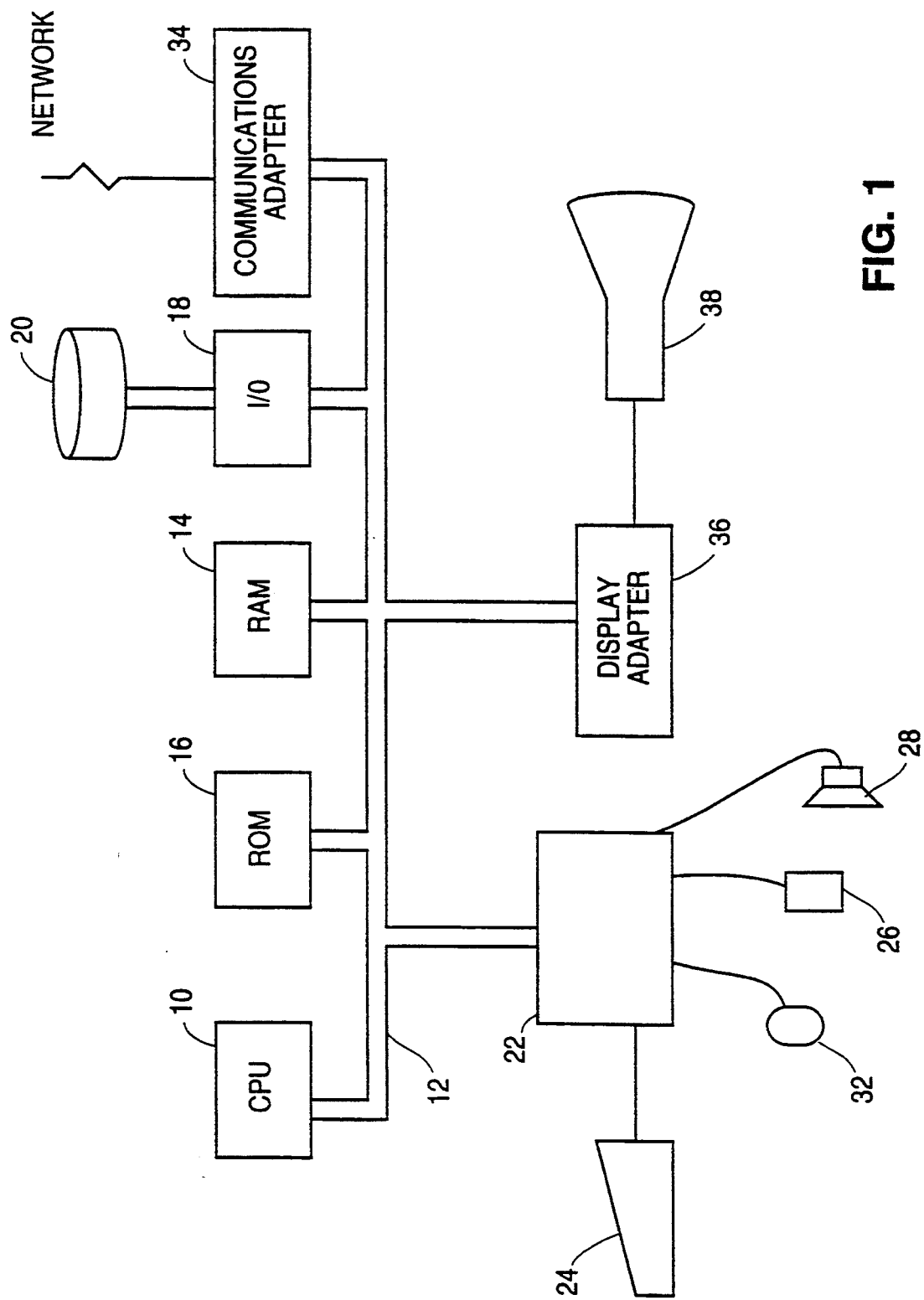
FIG. 1 is a illustrative example of the preferred hardware environment for the present invention.

Referring now to FIG. 1, the present invention is preferably practiced in the context of an operating system resident on a personal computer such as the IBM PS/2 or Apple Macintosh computer. A representative hardware environment is illustrated in FIG. 1, which illustrates a typical hardware configuration of a workstation in accordance with the subject invention having a central processing unit 110, such as a convention microprocessor, and a number of other units interconnected via a system bus 112. The workstation of FIG. 1 includes a Random Access Memory (RAM) 114, Read Only Memory (ROM) 116, and I/O adapter 118 for connecting peripheral devices such as disk units 120 to the bus, a user interface adapter 122 for connecting a keyboard 124, a mouse 126, a speaker 128, a microphone 132, and/or other user interface devices such as a touch screen device (not shown) to the bus, a communication adapter 134 for connecting the workstation to a data processing network and a display adapter 136 for connecting the bus to a display device 138. The workstation has resident thereon an operating system such as the IBM OS/2 operating system or the Apple System/7 operating system.

Polymorphic Management

Figure 2:
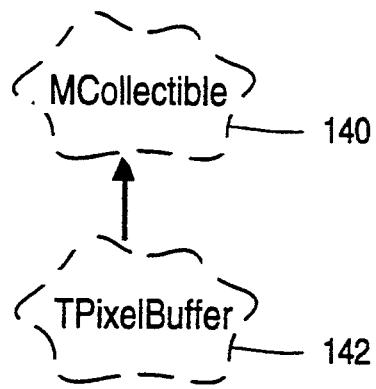
FIG. 2 is a illustrative example of the preferred subclass TPixelBuffer derived from the MCollectible class for the present invention.

Referring now to FIG. 2, in a preferred embodiment, polymorphically managed objects have common characteristics, preferably provided in a subclass derived from MCollectible, the parent class. The subclass inherits the attributes of the parent class from which it was derived. In the preferred embodiment, subclasses are derived from MCollectible 140. Objects created in these derived subclasses inherit attributes from MCollectible 140. In the preferred embodiment, the derived subclass TPixelBuffer 142, inherits the attributes of MCollectible 140, as augmented by the user, plus those attributes that may be added by the user. Thus, a user can customize an object created in a subclass derived from MCollectible, thereby fitting the object to his specific needs. Objects can be changed or created as requirements change.

Subclassing off of MCollectible 140 enables functions like saving, restoring, cloning, collecting, comparing, and assigning to become polymorphic operations. In an example of the preferred embodiment, the subclass TPixelBuffer 142, a subclass generated from MCollectible, extends this concept, as object are created in subclasses derived from TPixelBuffer. Thus, in the preferred embodiment, saving the contents of a PixelBuffer is accomplished through the MCollectible method FlattenPtr; restoring is accomplished through the MCollectible method ResurrectPtr; cloning is accomplished through the MCollectible's Clone method; and, the = and == operators provide for assignment and comparison operations.

Coordinate Conventions

Figure 3:
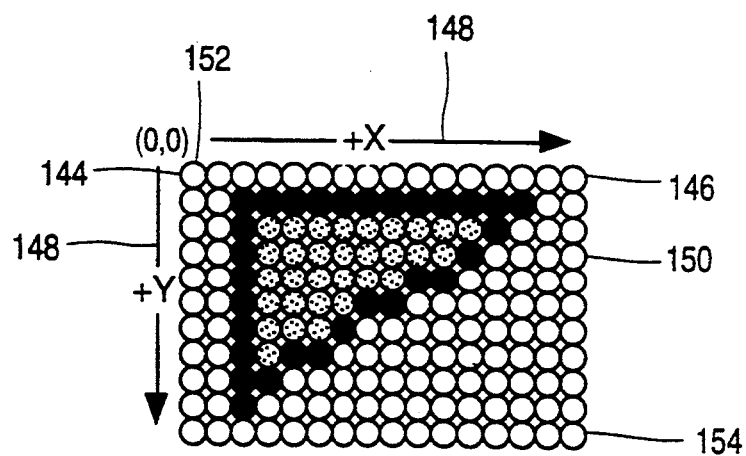
FIG. 3 is a illustrative example of the preferred coordinate system for the present invention.

Referring now to FIG. 3, in the preferred embodiment, PixelBuffers share the same specification of their coordinate system and that coordinate system's relationship with the continuous coordinate system. In the preferred embodiment, PixelBuffers are integral-sized arrays of pixels, thus it follows that pixels exist at integral locations and that the area of a PixelBuffer is described by a integral rectangle. As shown in FIG. 3, the origin 144 of the PixelBuffer 146 is the top left corner of the image with positive coordinates 148 extending rightward and/or downward. Preferably, the coordinates are infinitely thin and fall between pixels 150.

Preferably, a pixel's location is specified by the coordinates of its top left corner. Rectilinear areas are described in terms of the TLongRect class. Given that pixels fall between points on the coordinate plane, the location of the extreme pixels contained within a TLongRect are (fleft,fTop) 152 and (fRight-1, fBottom-1) 154, as shown in FIG. 3.

Active Boundary

Figure 4:
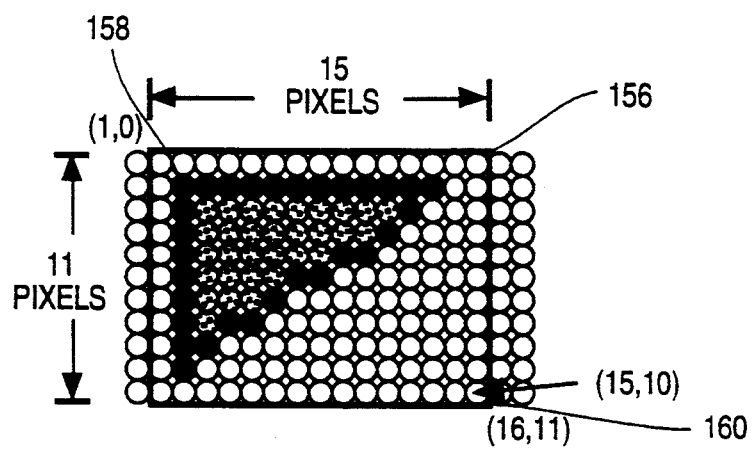
FIG. 4 is a illustrative example of the preferred active boundary for the present invention.

Referring now to FIG. 4, in a preferred embodiment, PixelBuffers specify which portion of their pixel memory array is active. Preferably this boundary rectangle 156 is defined in the terms of a TLongRect and is referred to as DeviceBounds. Clients preferably read and write to pixels that fall within this boundary rectangle 156. Although PixelBuffers appear to have exact dimensions for their pixel storage, various subclasses may implement pixel memories that are actually spatially or temporally encoded. GetDeviceBounds is the getter for the DeviceBounds, that is, GetDeviceBounds returns the value for the upper left 158 and bottom right 160 corners of a PixelBuffer.

Reference Resolution

Figure 5:
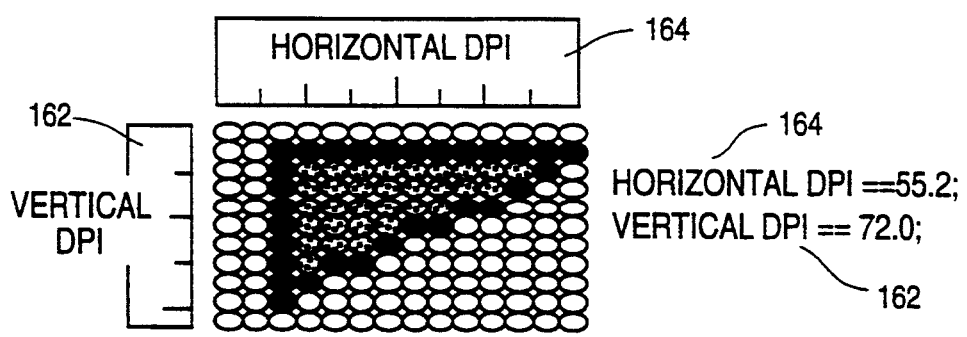
FIG. 5 is a illustrative example of the preferred reference resolution for the present invention.

Referring now to FIG. 5, in the preferred embodiment, PixelBuffer pixels represent some measurable area that can be specified as a relationship of pixels per some metric. Since the default unit of measure is specified in terms of points, consistency is maintained. Since many hardware devices have non square pixels, preferably both a vertical 164 and horizontal 166 specification is provided. In the preferred embodiment, these numbers are the vertical and horizontal pixels per inch which are specified as a number with fractional precision. GetVerticalDPI, and GetHorizontalDPI are the getters. SetVerticalDPI and SetHorizontalDPI are the setters. This value is reference information for the clients and is preferably preserved by the PixelBuffer.

Reference Orientation

Figure 6:
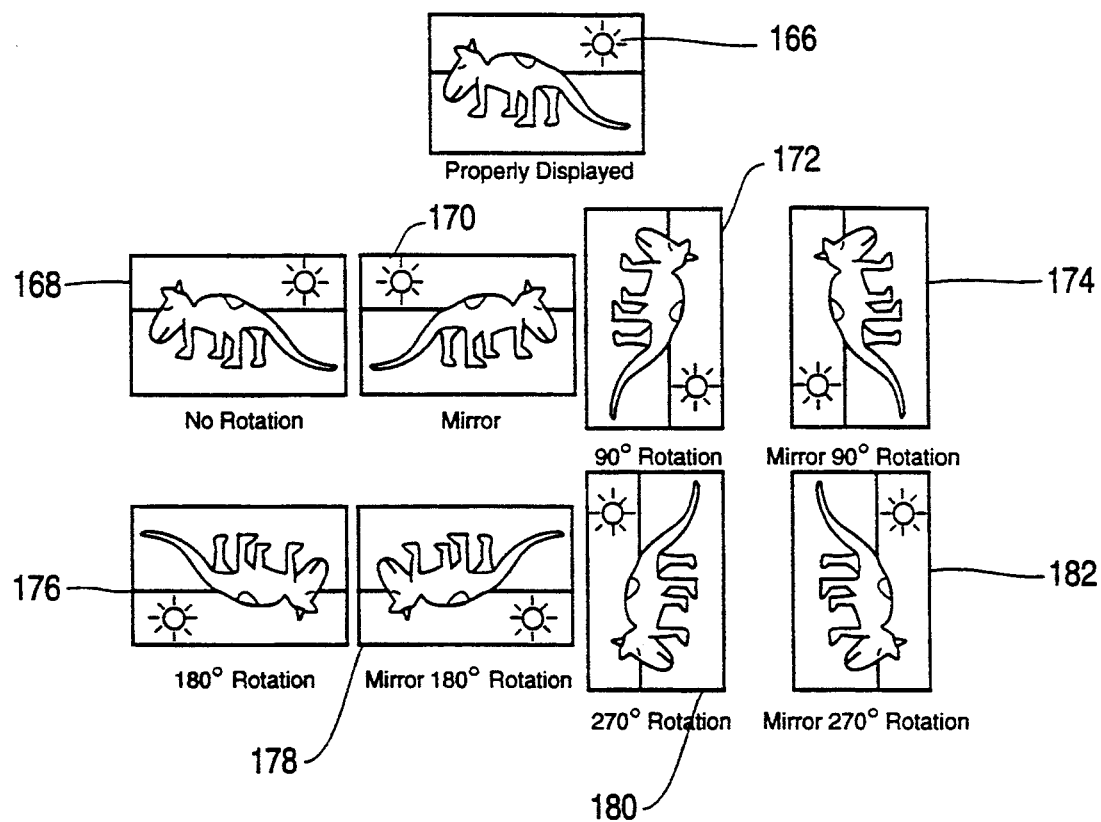
FIG. 6 is a illustrative example of the preferred reference orientation for the present invention.

Referring now to FIG. 6, in the preferred embodiment of the present invention, the pixel array may have a rectilinear orientation that is preferably taken into consideration when it is displayed or edited. As shown in FIG. 6, there are preferably eight possible pixel array orientations that are each the result of a rotation about the center and/or mirror image about the vertical axis. Preferably, pixel array orientation is specified from an enumeration of eight choices and is named the Orientation. GetOrientation is the getter and SetOrientation is the setter.

This is reference information for the client and is preferably preserved by the PixelBuffers. As shown in FIG. 6, the eight possible values for the Properly Displayed 166 orientation are: No Rotation 168, Mirror 170, 90 degrees rotation 172, Mirror 90 degrees rotation 174, 180 degrees rotation 176, Mirror 180 degrees rotation 178, 270 degrees rotation 180, and Mirror 270 degrees rotation 182.

From Continuous GCoordinates to Discrete Pixels

Figure 7:
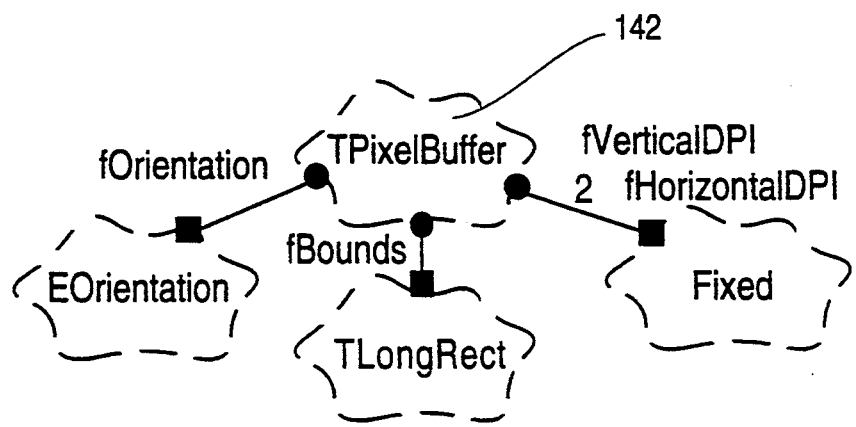
FIG. 7 is a illustrative example of the preferred transformation between the continuous coordinate plane and the discrete coordinate plane for the present invention.

Referring now to FIG. 7, in the preferred embodiment, preferably four attributes of the pixelbuffer that are used to create a proper transformation between the continuous coordinate plane and the discrete coordinate plane of the pixelbuffer. Preferably, CreateDeviceTransform is a method that creates a TGrafMatrix with the proper transformation mapping. Preferably, CreateDeviceTransform's sole argument is a TGPoint which is an origin in continuous space. In the preferred embodiment, the mapping of coordinates to and from continuous space to pixel space through this matrix is the client's responsibility.

Colormetric Characterization

Figure 8:
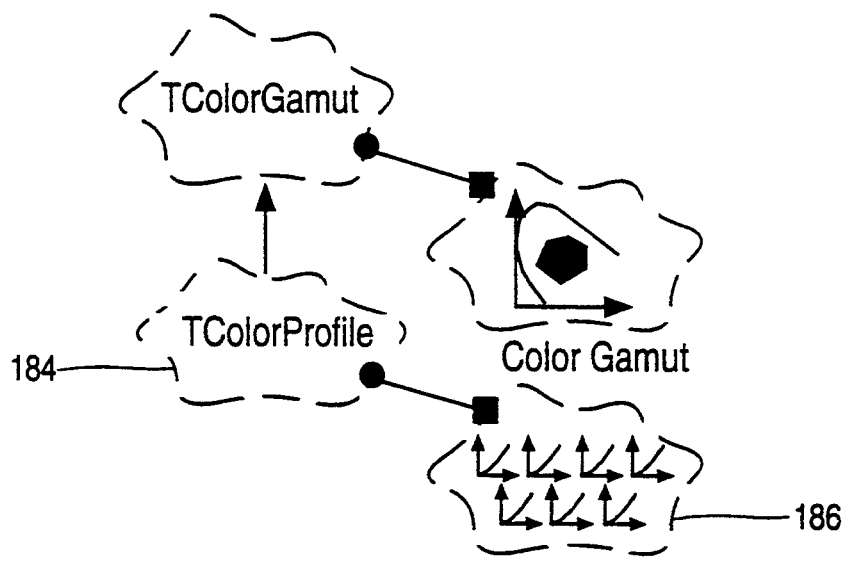
FIG. 8 is a illustrative example of the preferred colormetric characterization for the present invention.

In a preferred embodiment PixelBuffers preferably can specify a relationship between the colors they can produce and some absolute metric. Referring now to FIG. 8, the TColorProfile object 184 is designed to specify this relationship. Preferably, this object contains eight TxyYColors, each recording a data point measured from the output or input of the hardware device that the pixelbuffer represents. These colors form the vertices of a CIE color solid that encloses all colors that the pixelbuffer can reproduce.

Two of the measurements are taken at the white, and black points of the pixelbuffer. The six remaining colors contain the most saturated Cyan, Green, Yellow, Red, Magenta, and Blue that can be reproduced on this pixelbuffer. Preferably, the nonlinear response characteristics of the pixelbuffer are also recorded. In the preferred embodiment, this information is captured in seven Tonal Reproduction Curves or TRCs 186. Preferably, this group of TRCs measure the response from 256 uniform input steps from White, Cyan, Green, Yellow, Red, Magenta, and Blue to the Black point.

Figure 9:
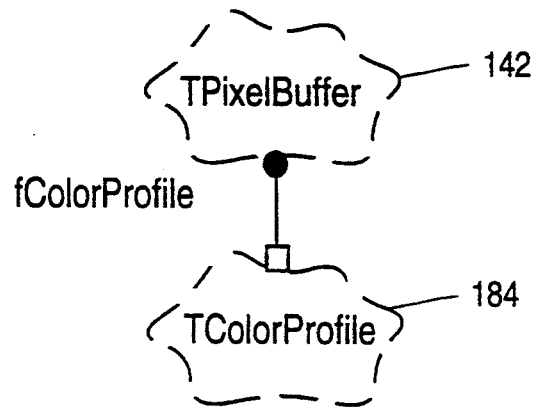
FIG. 9 is a illustrative example of the preferred TColorProfile for the present invention.

Preferably every pixelbuffer contains a reference to a TColorProfile 184 as shown in FIG. 9. In the preferred embodiment, a pixelbuffer that stores pixels in a CIE space has a TColorProfile 184. For example, consider the following two color matching scenarios for a pixelbuffer based on a CIE space. A pure colormetric match, which is a point process, would preferably not require the profile. A perceptual match that creates a mapping or morph from the 3-Dimensional color solid defined by the source profile into the color solid of the destination preferably does have the profile.

In the preferred embodiment, a pixelbuffer's color profile 184 is set through the SetColorProfile method and retrieved via the GetColorProfile method. Due to storage and efficiency considerations these TColorProfiles 184 are shared via reference counting. The details covering the actual color matching process are covered in the next section.

Pixel Memory Modification

End users expect a high level of performance from graphic systems. Meeting this expectation requires that rendering or scan conversion processes be allowed to alter the pixel memory in very specialized ways. In the preferred embodiment, these processes are shared. Since a pixelbuffer may have multiple tasks simultaneously drawing into it or reading from it, these mechanisms are preferably multitask safe. That is, there is orderly sharing of the pixel processes.

Get and SetPixel

Figure 10:
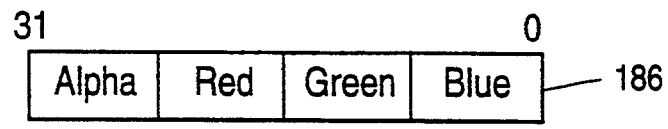
FIG. 10 s a illustrative example of the preferred 32-bit ARGB value for the present invention.
Figure 11:
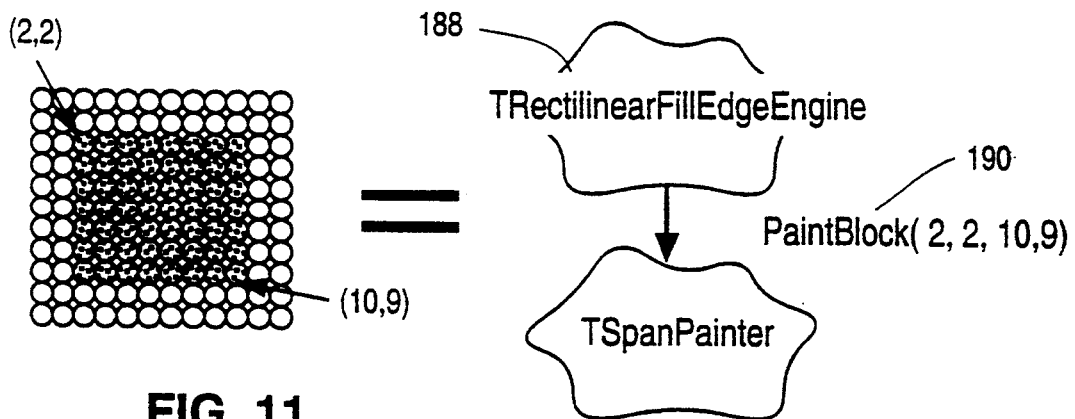
FIG. 11 a illustrative example of the preferred use of PaintBlock for the present invention.

In a preferred embodiment, even though it is not particularly efficient to use SetPixel and GetPixel routines to render, they do prove to be useful. Preferably, one such use is to support default versions of the other access mechanisms. TPixelBuffers 142 preferably supplies default implementations of the basic access mechanisms that rely on these routines. These are polymorphic operations that accept or return a 32-bit ARGB value 186 as shown in FIG. 10.

Subclasses preferably override the Get and SetPixel methods. However, for tools such as an eyedropper the performance would be sufficient. Preferably, GetCIElabPixel and SetCIElab pixel methods are provided for lossless color setting and getting.

Object Based "Blitloops"

Currently commercially available graphics systems usually provide a vocabulary with which users specify the visual appearance of rendered primitives. Unlike the method and apparatus of the present invention, these vocabularies are typically not extensible. They include support for the specification of properties such as color, patterns, transfer modes, color matching, and dithering. These properties serve three purposes: specification of a desired color at a given Pixel, specification of an interaction between that pixel and the current destination pixel, and specification of hints that state a preference for a given time and/or quality tradeoff.

When used together these properties represent several degrees of freedom. In the preferred embodiment, for a given pixelbuffer, there exists a subroutine that will set pixels to the state specified by these attributes. These subroutines are commonly referred to as "blitloops." Since for each degree of freedom there are a fixed set of choices, conventional graphic systems choose the appropriate blitloop through nested tests or through indexing into an array of pointers to blitloops.

In the preferred embodiment, clients also have access to these degrees of freedom through the settable attributes of a TGrafBundle and TPortBundle. Preferably, there are two characteristics for these blitloops: different rendering pipelines that utilize blitloops with different semantics, and blitloops that use different algorithms to achieve different appearance attributes. For further information on rendering pipelines, refer to the GrafDevice, and the 3-Dimensional rendering pipeline, herein incorporated by reference.

Although the client could be supplied with individual pixelbuffer methods for each of the required access mechanisms, there are several problems with this solution. First, additional variations of the method would have to be created to provide different algorithms. The method and apparatus of the present invention provides for each attribute, and degree of freedom, to have an infinite number of possibilities which rules individual methods. Another design consideration is that the mechanism must be multitask safe and efficient. This implies that information that can be cached between method calls is cached in a task safe way.

Thus, in the preferred embodiment, individual methods in the pixelbuffer can create "blitloop" objects. These objects are collectively referred to as painters. In the preferred embodiment, for each specialized way a client modifies pixel memory, an abstract base painter class is created with a corresponding Create method in the PixelBuffer. Preferably, all painters returned from a specific Create method are subclasses of a specific painter base class. The choice of which painter subclass to return is preferably driven by the client's desired algorithm. The painter subclass selection process is discussed more thoroughly in a later section. Preferably, caching strategies are utilized to spread the speed/performance costs due to storage allocation requirements over several draw operations.

In the preferred embodiment, five base classes are provided to meet the specialized needs of clients: TSpanPainter, THairLinePainter, TAntiAliasedHairLinePainter, TGlyphPainter, and BitBlt.

TSpanPainter

Filling and framing scan converted primitives are basic operations of a graphics system. In the preferred embodiment, four specific mechanisms are provided to support this type of client. Since these operations may be used in conjunction to alter the pixel memory, preferably they are methods of the same painter base class. In a preferred embodiment, these methods are 1) the filling of "spans", 2) filling of rectangular blocks, 3) filling of blended spans, and 4) filling an individual pixel that is blended with a color from an abutting edge. Preferably, the TSpanPainter object is acquired through the TPixelBuffers CreateSpanPainter method.

Preferably, during rasterization, many 2-Dimensional primitives are inserted into an edge list. In the preferred embodiment, clients which fall into this category are the TSimpleFillEdgeEngine, and the TSimpleFillAndFrameEdgeEngine pipeline objects. Scan conversion is preferably accomplished by traversing the edge list and generating "spans" to be filled. In a preferred embodiment, a span is a half-open interval of columns at a given row.

Preferably, to alleviate overhead costs, groups of spans are accumulated on the client's stack. Preferably, this is accomplished through several inline methods inherited from the abstract class. In the preferred embodiment, clients add spans to their local stack by calling PaintBufferedSpan. In the preferred embodiment, this method will flush the local span stack if it grows too large Preferably, when the client is finished rendering he calls FlushBufferedSpans to clear any remaining spans in the stack. If the client does not wish to buffer up spans then he can use the PaintSpans method. The PaintSpans method iterates over the array of scanline spans passed in the spans argument with count controlling this iteration.

Efficiently filling rectangular areas of pixels is another mechanism provided in the preferred embodiment. Preferably, clients which make use of this mechanism are the TRectilinearFillEdgeEngine 188, TRectilinearFillAndFrameEdgeEngine, TRectilinearAntialiasedFillEdgeEngine, and TRectilinearAntialiasedFillAndFrameEdgeEngine In the preferred embodiment, the method is called PaintBlock and the area is specified as a half open range of columns, a starting row, and a row count.

Preferably, if the scan conversion is antialiased, the present inventions allows the client to alter the transparency of the final pixels to give the impression of subpixel positioning or coverage. In the preferred embodiment, clients which fall into this category are the TAntialiasedFillEdgeEngine, TAntialiasedFillAndFrameEdgeEngine, TRectilinearAntialiasedFillEdgeEngine, and TRectilinearAntialiasedFillAndFrameEdgeEngine pipeline objects.

This type of pixel memory alteration is provided through the CompositeSpan method. Its arguments are a span and a pointer to an array of weighting values. Preferably, fully covered pixels filled through the PaintSpans or PaintBlock methods.

In the preferred embodiment, the final pixel altering method provides the pathway for painting antialiased abutting edges that use different painters. This situation is encountered when rendering a filled and framed primitive. Clients which find themselves in this situation are the TAntialiasedFillAndFrameEdgeEngine, and TRectilinearAntialiasedFillAndFrameEdgeEngine pipeline objects. In the preferred embodiment, the method PaintAbuttingEdgePixel arguments are a TLongPoint, and a blending weight. The blending weight is used to blend between the provided TColor and the color that this TSpanPainter desires at the location.

Preferably, the abutting edges color is set through the SetAbuttingEdgeColor method. Preferably, two additional methods are provided to facilitate blending. The client inquires as to what color a painter desires at a given location. The method is GetDesiredColorAt, which uses a TColor and a TLongPt as arguments. GetDesiredColor returns in the TColor the color that the painter desires at the TLongPt location. In the preferred embodiment, when the client encounters an abutting edge it uses one painters GetDesiredColor and passes the desired color into the other painters SetAbuttingEdgeColor method, prior to using PaintAbuttingEdgePixel.

The final method allows for this interaction to be performed efficiently for abutting edges whose painters are filling with one solid color and IsShadingConstant. When IsShadingConstant is TRUE, the GetDesiredColorAt/SetAbuttingEdgeColor combo has to be performed only once. Without these methods it is impossible to correctly antialias the interior seam encountered with filled and framed primitives.

In the preferred embodiment, methods are packaged together as a painter object to meet the needs of clients. Packaging meets the needs of several clients. Preferably, method are packaged together to service various client needs such as: 1) a client filling aliased blocks of pixels such as the TRectilinearFillEdgeEngine, 2) a client filling aliased spans from scan converted primitives such as the TSimpleFillEdgeEngine, 3) a client filling antialiased scan converted primitives, 4) a client filling antialiased positioned blocks such as the TRectilinearAntialiasedFillEdgeEngine, and 5) a client filling pixels that contains antialiased abutting edges from two painters such as the TAntialiasedFillAndFrameEdgeEngine.

Figure 12:
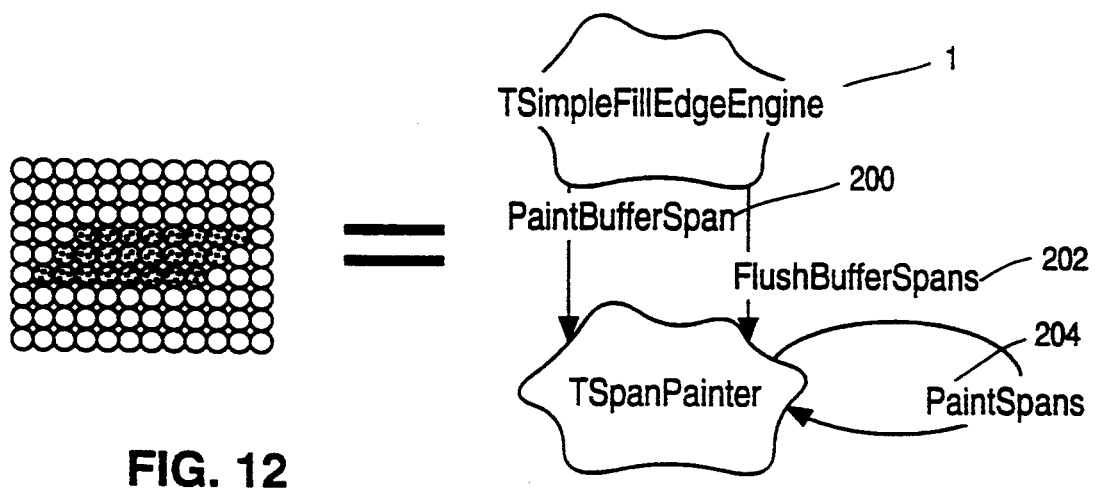
FIG. 12 is a illustrative example of the preferred use of PaintBufferedSpan, and FlushBufferedSpans, and PaintSpans for the present invention.
Figure 13:
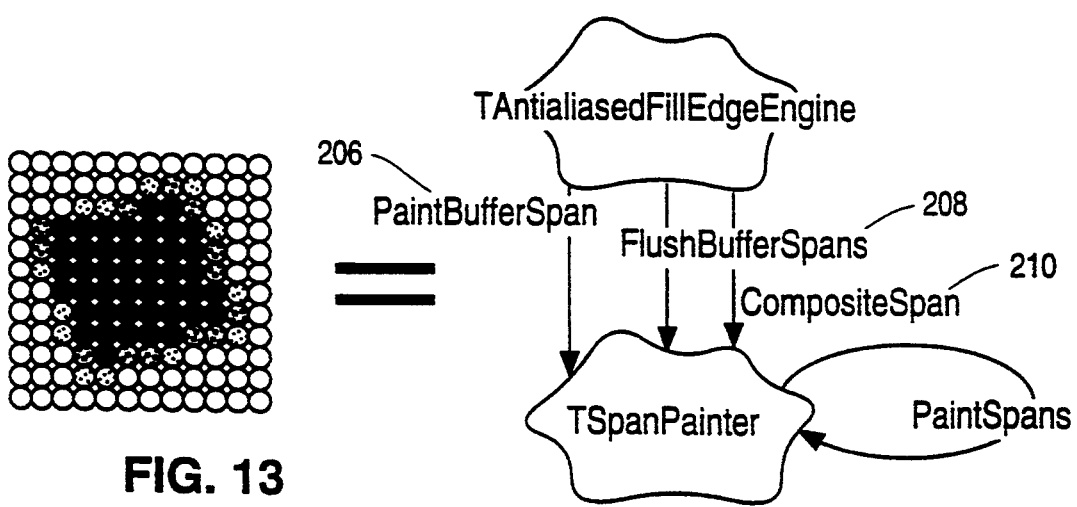
FIG. 13 is a illustrative example of the preferred use of PaintBufferedSpan, FlushBufferedSpans on Opaque spans, and CompositeSpan for the present invention.

Referring now to FIG. 12, the first client preferably may use PaintBlock 190 exclusively. The second client uses PaintBufferedSpan 200, and FlushBufferedSpans 202 which internally calls the PaintSpans 204 method, as shown in FIG. 12. As shown in FIG. 13, client three may use PaintBufferSpan 206, and FlushBufferedSpans 208 on Opaque spans, and CompositeSpan 210 on those pixels which are blended with the existing pixels.

Figure 14:
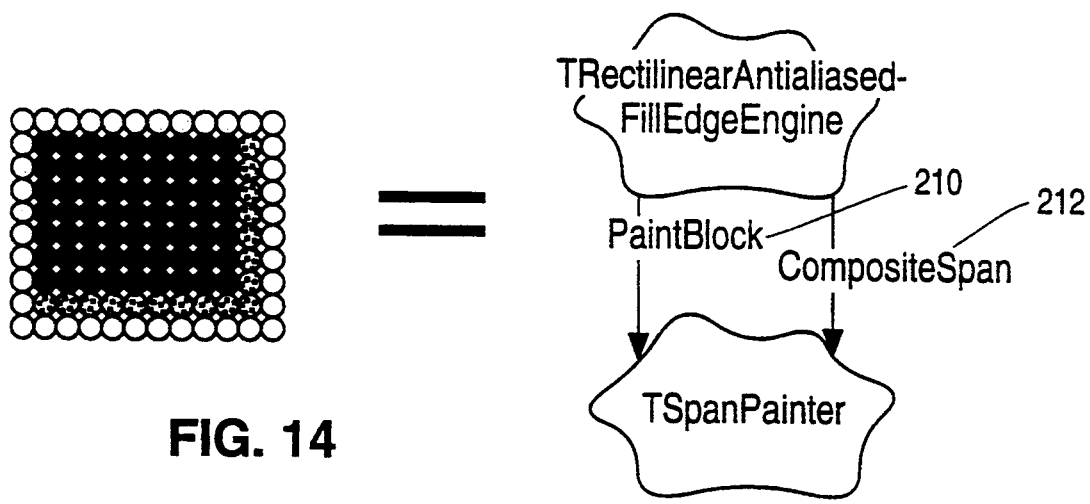
FIG. 14 is a illustrative example of the preferred use of PaintBlock on opaque pixels and compositeSpan on those pixels blended with existing pixels for the present invention.

Referring now to FIG. 14, client four may use PaintBlock 210 on the opaque pixels and CompositeSpan 212 on those pixels which need to be blended with the existing pixels.

Figure 15:
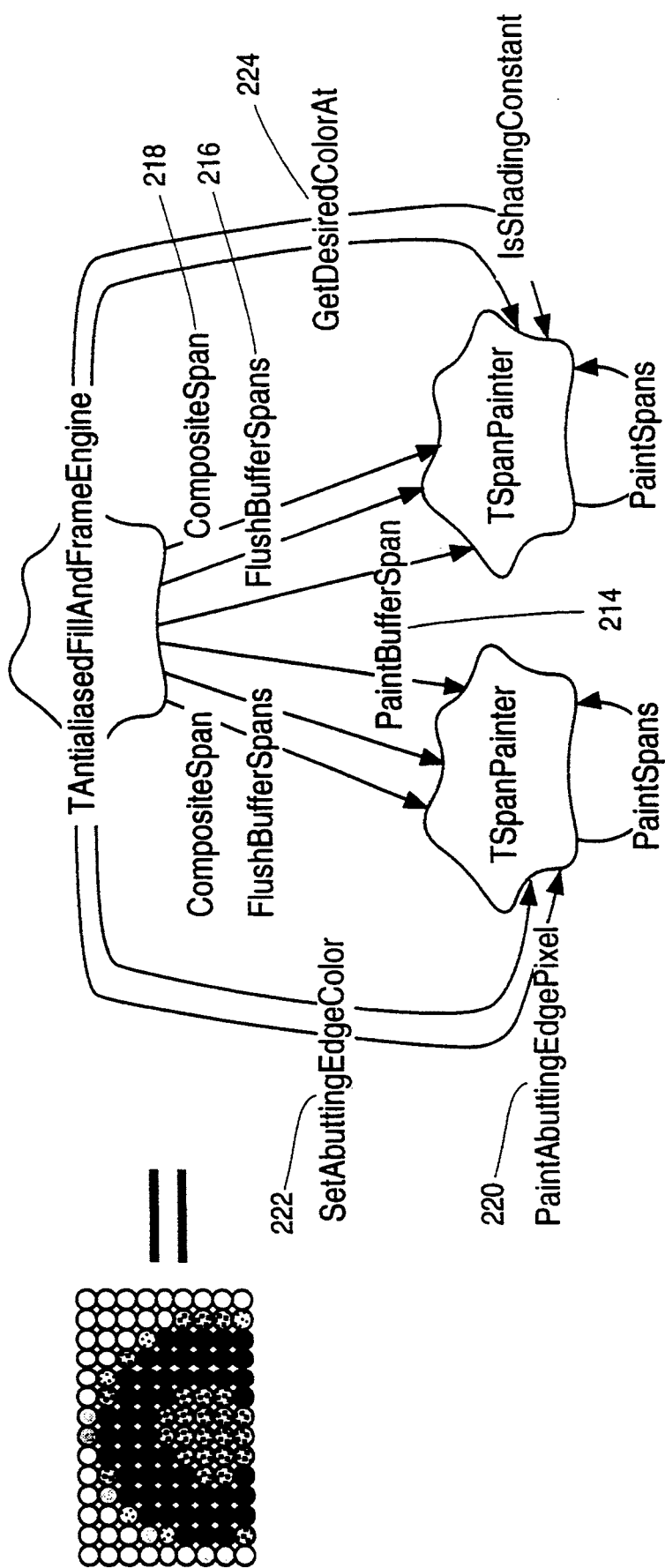
FIG. 15 is a illustrative example of the preferred use of PaintBufferedSpan, flushBufferedSpans for opaque pixels for the present invention.

Referring now to FIG. 15, client five's case is more complex. Client five may use the appropriate span painters PaintBufferSpan 214, and FlushBufferedSpans 216 methods for opaque pixels. Preferably, the exterior edge of the frame would be rendered through the CompositeSpan 218 method of the frame spanpainter. Preferably, the interior seam between the frame and filled edges is rendered through the fill spanpainters PaintAbuttingEdgePixel 220 method, only after its SetAbuttingEdgeColor 222 has been called with the color returned from the framing spanpainters GetDesiredColorAt 224 method.

THairlinePainter

Figure 16:
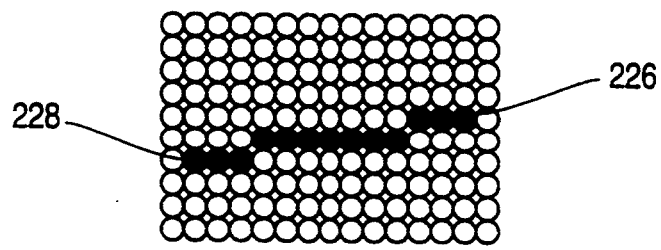
FIG. 16 is a illustrative example of the preferred THairLinePainter for the present invention.

Referring now to FIG. 16, in the preferred embodiment, a client such as THairlineFrameVertexEngine utilizes a specialized mechanism for drawing thin lines or hairlines. Hairlines are defined as lines drawn at the finest resolution of the pixelbuffer. With raster devices this is a single pixel wide line. Hairlines are rendered as the result of lines, polylines, framed polygons, curves, and 3-Dimensional wireframes being drawn with the Hairline attribute turned on in TGrafBundle.

The end points 226, 228 of the hairline are preferably specified with fractional precision. TGrafBundle is acquired through the TPixelBuffers CreateHairlinePainter method. Subclasses preferably override PaintHairline. In the preferred embodiment, PaintHairline takes into consideration nonsquare pixel aspect ratios that are encountered, for example, in DVI images or flatscreen technologies. Preferably there is an overloaded PaintHairline method provided that clips against a LongRect.

TAntialiasedHairlinePainter

Figure 17:
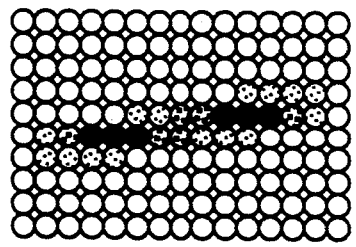
FIG. 17 is a illustrative example of the preferred TAntialiasedHairlinePainter for the present invention.

Referring now to FIG. 17, in the preferred embodiment, a client such as TAntialiasedHairlineFrameVertexEngine needs a specialized mechanism for drawing antialiased hairlines. Antialiased hairlines are the thinnest line that the pixelbuffer is capable of rendering while conveying subpixel positioning and coverage. They commonly turn out to be to 3 pixels wide. Preferably, the end points of the hairline are specified with fractional precision. In the preferred embodiment, this object is acquired through the TPixelBuffers CreateAntialiasedHairlinePainter method. Subclasses preferably override PaintAntiAliasedHairline, and SetFilterPixel. Preferably PaintAntiAliasedHairline and SetFilterPixel take into consideration nonsquare pixel aspect ratios that are encountered, for example, in DVI images or flatscreen technologies. In the preferred embodiment, an overloaded PaintAntiAliasedHairline method is provided that clips against a TLongRect.

TGlyphPainter

Figure 18:
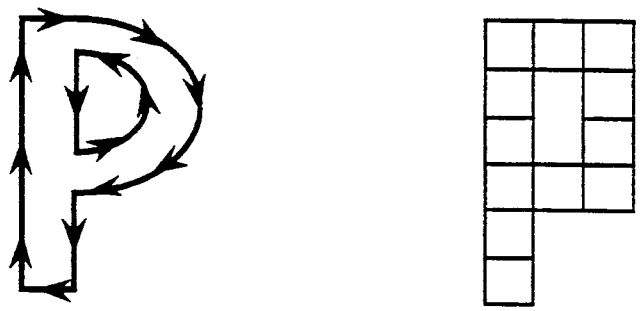
FIG. 18 is a illustrative example of the preferred outline glyph and bitmap glyph for the present invention.

Referring now to FIG. 18, in the preferred embodiment, glyphs are accelerated. Glyphs contain the high level contour description. In the preferred embodiment, clients such as TFramebuffer::RenderGlyphRun request bitmaps or grayscale pixelmaps of a given TFont from the TFontServer. Preferably, the TFontServer asks the appropriate TFontHandler to take the high level contour description of a glyph and produce a bitmap or grayscale pixelmap. In the preferred embodiment, once the TFramebuffer has the result, an efficient method to composite the bitmap or pixelmap onto a TPixelBuffers is provided. In the case of bitmaps the preferred object is a TGlyphPainter.

Figure 19:
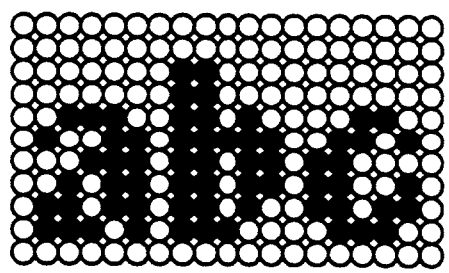
FIG. 19 is a illustrative example of the preferred TGlyphPainter for the present invention.

Referring now to FIG. 19, in the preferred embodiment TGlyphPainter contains the methods necessary to render the bitmap form of glyphs. These bitmaps preferably act as opaque mattes through which the user supplied paint is composited. The first of these methods is PaintSmallGlyph that accepts a destination origin in the dstx and dsty arguments, as well as a TGlyphPixmap. This method is for unclipped glyphs. The next method is an overloaded PaintSmallGlyph. In the preferred embodiment, PaintSmallGlyph takes an additional argument which is a rectangular clip area in the destination. This object is acquired through the TPixelBuffers CreateBitmapGlyphPainter method. Subclasses preferably override both PaintSmallGlyph methods. In an alternative embodiment, glyphs are batched up and sent to a PaintSmallGlyphs method instead of PaintSmallGlyph.

TAntialiasedGlyphPainter

Figure 20:
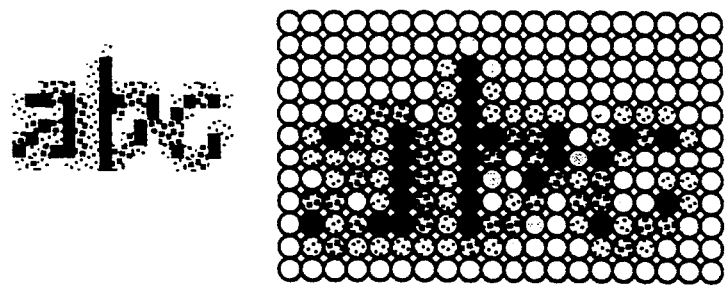
FIG. 20 a illustrative example of the preferred TAntialiasedGlyphPainter for the present invention.
Figure 21:
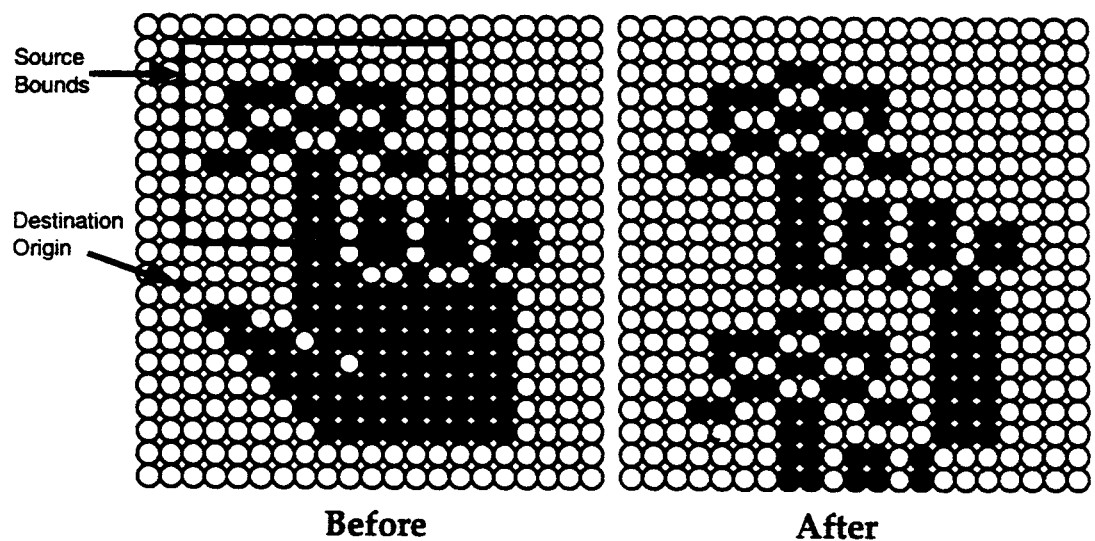
FIG. 21 is a illustrative example of the preferred BitBlt (bit block-transfer) for the present invention.
Figure 22A:
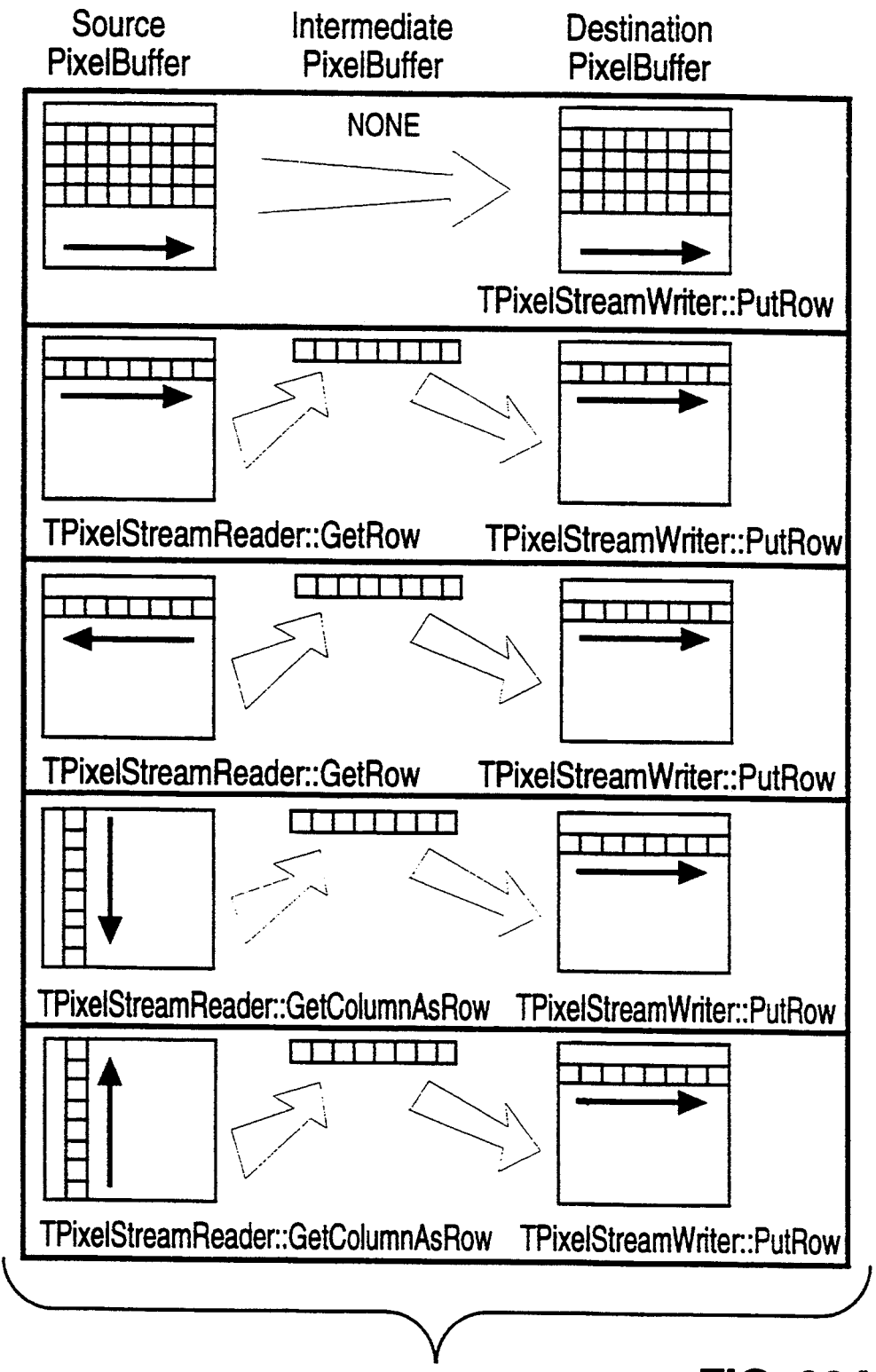
FIG. 22 is a illustrative example of the preferred transformations using a PixelStreamReader and/or PixelStreamWriter for the present invention.
Figure 22B:
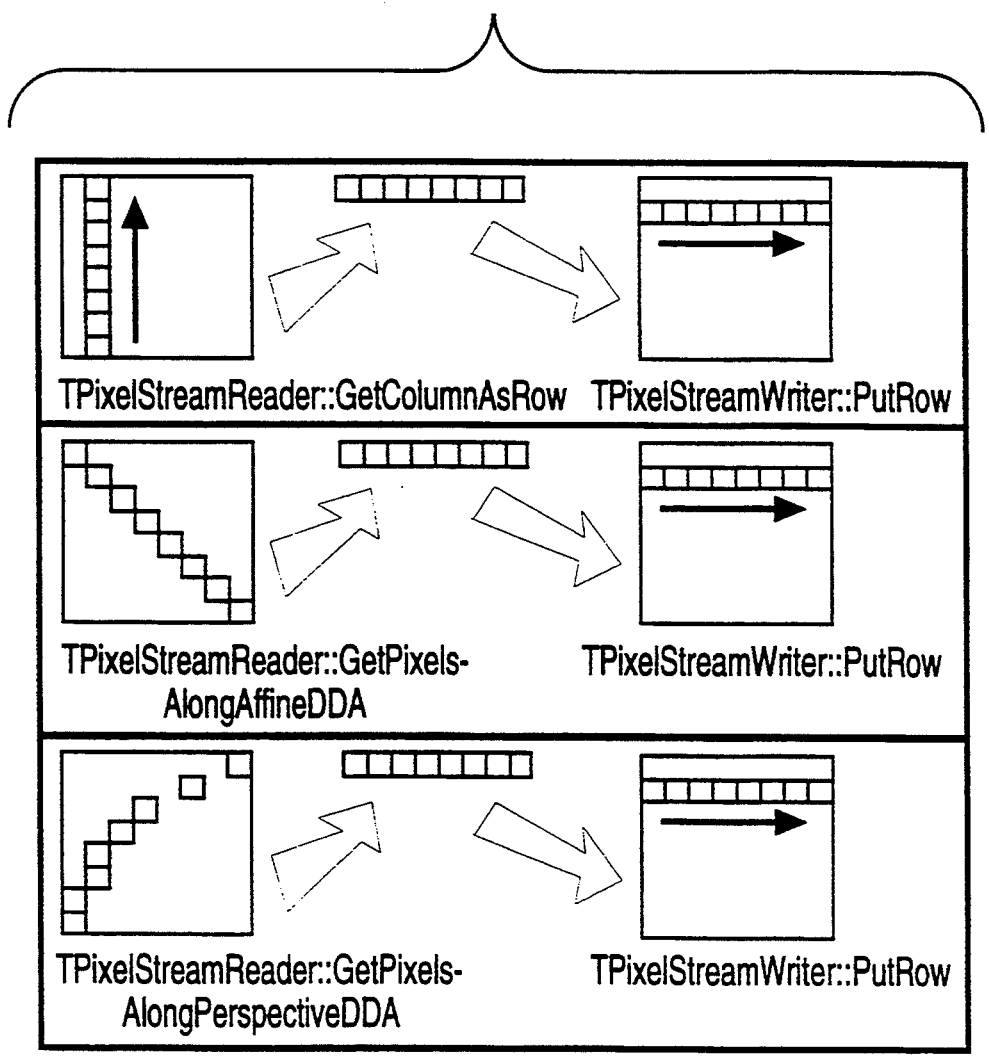

Turning now to FIG. 20, in the preferred embodiment, there are two low-level representations of glyphs, one being bitmaps and the other grayscale pixelmaps. The grayscale pixelmaps contain the transparency information necessary to convey the subpixel positioning and coverage of the glyph. These pixelmaps act as translucent mattes through which the user supplied paint is composited. In the preferred embodiment, TAntialiasedGlyphPainter contains the methods to render the grayscale pixelmaps.

Preferably, these methods are identical to the ones found in TGlyphPainter with the exception that they work with grayscale pixelmaps. In a preferred embodiment, this object is acquired through the TPixelBuffers CreateGrayscaleGlyphPainter method. Subclasses preferably override both CompositeSmallGlyph methods. In the preferred embodiment, the task of subpixel positioning the glyph is the responsibility of the font server. In an alternative embodiment glyphs may be batched up and sent to a CompositeSmallGlyphs method instead of CompositesmallGlyph. In yet another alternative embodiment intersecting glyphs may be assembled into a strike by adding their mattes together before compositing to the destination. Preferably CompositeSmallGlyphs enables summing of the grayscale mattes from abutting glyphs which results in higher quality results.

BitBlt (bit block-transfer)

In the preferred embodiment, a mechanism forms the graphic foundation for quick interactions such as when end users scroll the contents of a window or reposition it onto the same monitor. Preferably, instead of erasing and redrawing the contents of the scrolled or repositioned window, the pixels that make up the window's contents are block moved. This operation is a memory move operation and should not be confused with the CopyImage method which provides more general purpose functionality.

Preferably this operation copies the pixel memory in such a way as to avoid writing to pixels that still need to be read. In a preferred embodiment, TPixelBuffers's MovePixelBlock method takes a TLongRect as a source and a TLongPt as the destination origin. Preferably, there is a slight twist on this method which clips the operation to a region. Preferably the overloaded MovePixelBlock that accepts a region, performs clipping. Graphics accelerator cards frequently perform this function. If modifiable, subclasses preferably override the unclipped version of this method.

Preferable a very similar mechanism is used for block moving pixels from one PixelBuffer to another PixelBuffer of the same type. In the preferred embodiment this method is named MovePixelBlock. It takes a TLongRect for the source rectangle, a TLongPt for the destination origin, and a const reference to a TPixelBuffers that contains the source pixels. Preferably, an exception is generated if the run time type casting reveals that the PixelBuffers are not of the same class lineage. (The lack of a low level entry point for this type of functionality is one of the key reasons Macintosh developers bypass Quickdraw when drawing offscreen.)

In the preferred embodiment an additional overloaded MovePixelBlock method accepts a region through which the results are clipped. (This is another operation that graphic accelerator cards frequently implement.) If modifiable, subclasses preferably override the unclipped version of this method. Preferably, the default implementation of the clipping versions of MovePixelBlock make use of their unclipped counterparts. Preferably, a subclass can preferably override these, if a different approach to clipping such as one based on bitmasks is preferred.

In order to polymorphically use the above method, it is not always enough to ensure that the pixelbuffers are of the same subclass. Preferably, additional tests, such as checking for equality of color tables may be performed. In the preferred embodiment this is a test that can be performed by the destination PixelBuffer. In the preferred embodiment, this method is named CanBlock-MovePixels and takes a const reference to another pixelbuffer as its argument and returns a Boolean result. Subclasses preferably supply this method if they are modifiable and use a more elaborate test than a comparison of class names.

CopyImage Objects

In the preferred embodiment, one primitive that a graphic system renders is an image. Preferably, the PixelBuffers's CopyImage method renders a source pixelbuffer upon the destination PixelBuffer, which is itself. Preferably, the source pixels undergo an affine, or projective transformation into the destination. The attributes contained by the pixels of the source image might undergo a transformation at a high level such as a transfer mode, or at the low level such as conversion into another pixel format.

In the preferred embodiment, CopyImage accepts a source pixelbuffer, a source geometry specification, a destination geometry specification, and a grafstate. Preferably, these geometry specifications contain information regarding the transformation type, maximal bounds, the transformed geometry, and clipping information. Preferably, these specifications are calculated by two different framebuffers in their CopyImage or CopyImageTo methods. Preferably, TPixelBuffers's CopyImage is the first method to evaluate the specifications together. It determines the proper method to transform the pixels, performs the setup needed, and enters the next stage of the CopyImage pipeline.

Extensible Copyimage Engine and PixelStreamers

In the preferred embodiment, since additional pixelbuffer subclasses will be added to the system, the CopyImage implementation preferably accomplishes operations polymorphically. The preferred embodiment provides the first graphics system with an extensible pixel transformation engine. In the preferred embodiment, this constraint also allows for an implementation of CopyImage that exists at the TPixelBuffer level, where no assumptions about the pixel memories organization exist.

In the preferred embodiment, "blitloop" mechanisms enable the CopyImage engine to polymorphically move pixels from one PixelBuffer into another PixelBuffer. Given the current and growing diversity of PixelBuffer subclasses, it is preferred that each of the PixelBuffers will not contain a "blitloop" for all of the others pixel memory organizations. Instead, in the preferred embodiment each PixelBuffer is expected to know about a few standard pixelbuffer types. These types are TAlpha8Gray8PixelBuffer, TA8R8G8B8PixelBuffer, and TL12A12B12PixelBuffer.

This default behavior enables the CopyImage engine to stream pixels from a

PixelBuffer of unknown organization into one of the three standard forms. Preferably, the destination PixelBuffer provides another "blitloop" mechanism to move pixels from this intermediate PixelBuffer into the destination with results that reflect the TTransferMode, and TDitherHint. In the preferred embodiment, the TPixelStreamReader, and TPixelStreamWriter objects meet these needs. The two objects are collectively called pixel streamers. These pixel streamers share many goals and design considerations with painters.

In the preferred embodiment, the three common PixelBuffers formats provide a least-common-denominator solution. However, with only these three intermediate formats available, a pixel or attribute streaming engine would be loose and slow. To resolve this issue, in the preferred embodiment, each PixelBuffer provides a set of these pixelstreamers that form a working set. This problem is similar in spirit to the new paint, new painter, and old PixelBuffer problem. It is solved in a similar way. A closer examination of how to implement a CreatePixelStreamWriter method is covered more thoroughly later.

Preferably, each pixelbuffer can produce a token which is its unique key. Preferably, this key specifies an IsA relationship. In the preferred embodiment, the GetNativeKey method returns this token. GetNativeKey allows subclasses to leverage off of instantiatable superclasses, in a way that GetClassNameAsToken cannot. Preferably, these keys enable the CopyImage engines to type negotiate a common ground between the source pixelbuffer and the destination pixelbuffer. In the preferred embodiment, methods relying on the validity of this key can use run time type identification for assurance.

Preferably, the CopyImage engine acquires a PixelStreamReader that can move the source pixelbuffer pixels into a pixelbuffer with a given key, through the pixelbuffer's CreatePixelSteamReader method. In the preferred embodiment, if the source pixelbuffer has no match for the given key it returns nil. Preferably, PixelBuffers also have CreateA8R8G8B8PixelStreamReader, CreateAlpha8Gray8PixelStreamReader, and CreateL12A12B12PixelStreamReader methods which return the appropriate type. In the preferred embodiment, like the painter search mechanism, if new specialized PixelStreamReaders are dynamically added to the pixelbuffer, they can be returned.

In the preferred embodiment, the CopyImage engine uses a PixelStreamWriter from the destination PixelBuffer that can move pixels from a PixelBuffer with a given key into itself while reflecting the TTransferMode, and TDitherHints supplied. Preferably, CopyImage can acquire a PixelStreamWriter through the destination's CreatePixelSteamReader method. In the preferred embodiment, if the destination PixelBuffers has no match for the given key, TTransferMode, and TDitherHint, nil is returned. Preferably, PixelBuffers have CreateA8R8G8B8PixelStreamWriter, CreateAlpha8Gray8PixelStreamWriter, and CreateL12A12B12PixelStreamWriter methods which return a PixelStreamWriter that match the key, simple transfer modes, and simple dither hints. Preferably, like the painter search mechanism, if new specialized PixelStreamWriters are dynamically added to the PixelBuffers, they can be returned.

In the preferred embodiment, PixelStreamReaders have the protocol needed to efficiently read streams of a PixelBuffer subclasses pixels. Preferably the pixel moving methods include GetRow, GetColumnAsRow, GetPixelsAlongAffineDDA, and GetPixelsAlongPerspectiveDDA. In the preferred embodiment, a PixelStreamReader subclass can highly optimize the fetching of rows, columns, or interpolated coordinate spans of pixels. Preferably, PixelStreamReaders are subclassed to create an efficient path from one pixel format directly into another.

In the preferred embodiment, AdviseWillRead is a supplementary method, preferably called before calls to the pixel moving methods. This method allows the PixelStreamReader to efficiently allocate buffers needed for decompression, or for some other need.

Preferably, PixelStreamWriters have the protocol needed to efficiently write a row or rows of a given PixelBuffer subclasses pixels into the destinations format. The pixel moving methods comprise PutRow and PutRows. Preferably, the results should reflect the TlransferMode, and TDitherHint attributes. Preferably, a given PixelStreamWriter subclass can optimize the writing of a row, or rows of pixels undergoing format conversion, transfer modes, and dithering technique. Preferably, two supplementary methods aid the PixelStreamWriter. In the preferred embodiment, these are AdviseWillModify, and RequiresScanlineOrderedSets. Preferably, AdviseWillModify is called prior to calling the Sets method. Preferably, this allows the PixelStreamWriter subclass to optimize allocation of buffers, etc. The RequiresScanlineOrderedSets method returns TRUE if the rows are to written sequentially, as is the case with error diffusion.

Preferably, Subclasses of TPixelBuffers implement PixelStreamers for their native type, TA8R8G8B8PixelBuffer, TAlpha8Gray8PixelBuffers, and TL12A12B12PixelBuffer. If not, the default get and SetPixel based PixelStreamers will be returned. Preferably, the type negotiation which the intermediate format is implemented by TPixelBuffers's CreateMatchingPixelStreamers method. Subclasses preferably override this method to search first for the most efficient middle ground. The default implementation preferably searches first for a pair of PixelStreamers that can read and write either the source or destination pixelbuffers format.

If the initial search fails, CreateMatchingPixelStreamers preferably fall back to one of the required types. A more elaborate search scheme could use the GetTypesFromPixelStreamers method. The GetTypesFromPixelStreamers method preferably is called to insert all of the possible types into a TDeque. The destination pixelbuffer then chooses from the list a middle ground type that it supports. Since a pixelbuffers pixelstreamers are kept in a dictionary that can be modified at runtime, it is preferred that these methods query this dictionary to fill in this TDeque instead of filling it only with known defaults.

Preferably, CreateMatchingPixelStreamers is called for all but two cases of CopyImage. If the CopyImage operation is only a geometrical translate, and through the CanBlockMovePixels method it is determined that a block move is possible, then the destinations MovePixelBlock method preferably will be called. The second case also occurs when the CopyImage operation is just a translate. If the destination pixelbuffer can produce a PixelStreamWriter that understands the source PixelBuffer, a PixelStreamReader is not needed. In the preferred embodiment, other transformations rely upon type negotiated PixelStreamers to read, write, and perform transformations between different types of PixelBuffers.

The following CopyImage methods preferably appear in its private section. The implementation of these methods is independent of the particular subclass. Preferably the supported affine and perspective transformations can be routed into one of the following techniques. In the preferred embodiment, each technique has its own unique setup and method, which appears as a protected method of the TPixelBuffer object. Since these methods employ PixelStreamReaders and PixelStreamWriters, they preferably will work with the appropriately subclassed Pixelbuffers.

MovePixelBlock performs translations from the source pixels into the destination, through a memory move. StreamPixelBlock performs a translate on the source pixels into the destination with a PixelStreamWriter. StreamRectilinearRotatedPixelBlock performs scale invariant rectilinear rotates on the source pixels through a PixelStreamReader, and a PixelStreamWriter. StreamScaledPixelBlock performs point sampled scales with or without a rectilinear rotation on the source pixels with a PixelStreamReader, and a PixelStreamWriter. StreamAndFilterScaledPixelBlock performs filtered scales with or without a rectilinear rotation from the source pixels through a PixelStreamReader, and a PixelStreamWriter. StreamPixelsintoConvexPolygon performs point sampled transformations of the source pixels from the source through a PixelStreamReader, writing the results into a convex polygon in the destination through a PixelStreamWriter. StreamAndFilterPixelsintoConvexPolygon performs filtered transformations of the source pixels from the source through a PixelStreamReader, writing the results into a convex polygon in the destination through PixelStreamWriter.

StreamPixelBlock

Figure 23:
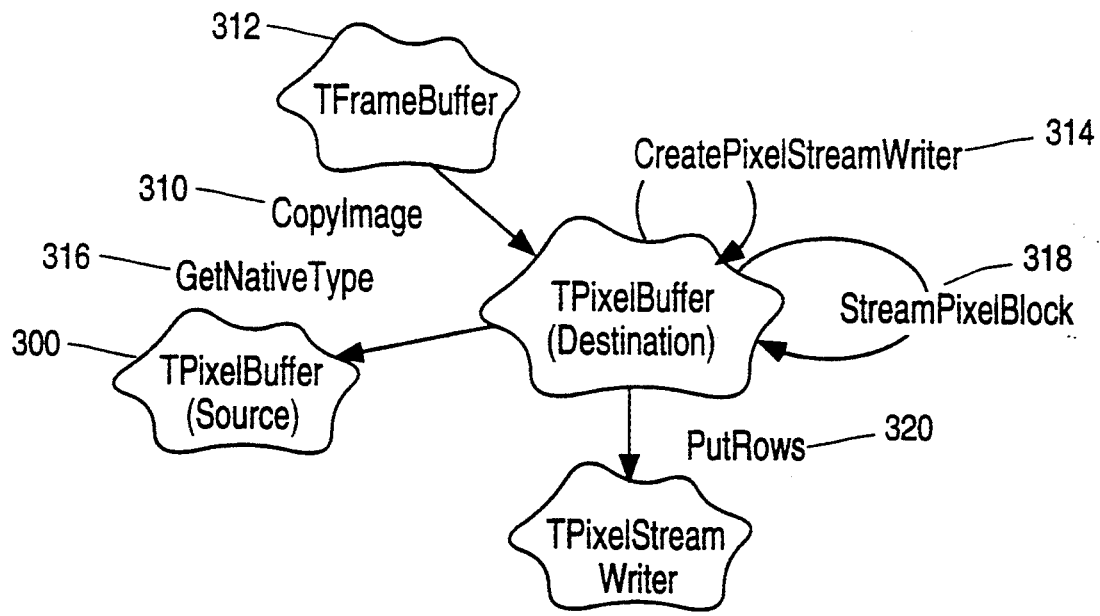
FIG. 23 is a illustrative example of the preferred use of StreamPixelBlock for the present invention.

Referring now to FIG. 23, in the preferred embodiment, the StreamPixelBlock method accomplishes its work by calling the PutRows method of the destination's PixelStreamWriter. This allows for quick pixel format conversions, transfer modes, and dithering. As shown in FIG. 23, in the preferred embodiment, TPixelBuffer::CopyImage 310 is called by a TFrameBuffer 312 method. TPixelBuffer::CopyImage 310 then invokes its own CreatePixelStreamWriter 314 method. Preferably, the CreatePixelStreamWriter 314 method determines if it can read the source PixelBuffer 300 by asking the source PixelBuffer 300 for its type through the source PixelBuffers's GetNativeType 316 method. Preferably, CreatePixelStreamWriter 314 then returns a PixelStreamWriter that matches this type and the appropriate bundle attributes. In the preferred embodiment, TPixelBuffer::CopyImage 310 next invokes its StreamPixelBlock 318 method which invokes the PixelStreamWriter's PutRows 320 method with the source pixelbuffer.

StreamRectilinearRotatedPixelBlock

In the preferred embodiment, the StreamRectilinearRotatedPixelBlock method polymorphically calls either the source PixelStreamReader's GetRow or GetColumnAsRow method to place pixels into a temporary pixelbuffer. Preferably, the destination PixelStreamWriter's PutRow method is used to write out the pixels. This allows for quick scale invariant rectilinear transfers of pixel memory to and from the same type or those undergoing format conversions, transfer modes, and dithering.

Figure 24:
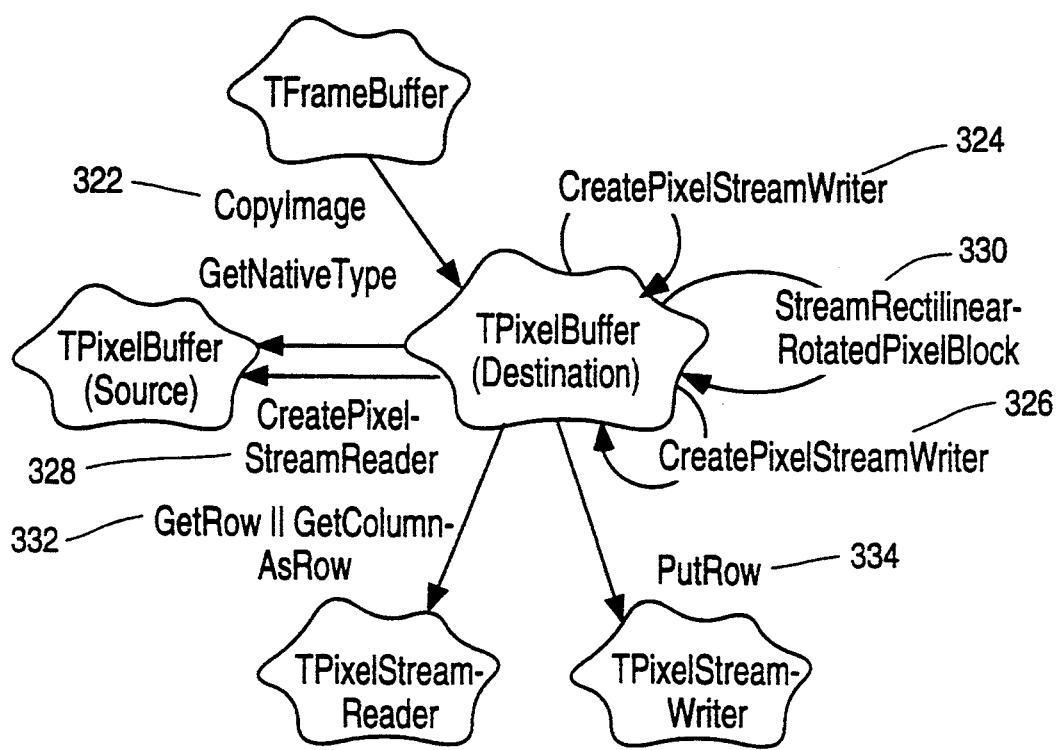
FIG. 24 is a illustrative example of the preferred use of StreamRectilinearRotatedPixelBlock for the present invention.

Referring now to FIG. 24, in the preferred embodiment, TPixelBuffer::CopyImage 322 is called by a TFrameBuffer method. Preferably TPixelBuffer::CopyImage 322 then invokes its own CreateMatchingStreamers 324 method. Preferably, the CreateMatchingStreamers 324 method determines if it can type negotiate a PixelBuffer format for which the source pixelbuffer can create a PixelStreamReader and for which the destination, itself, can create a PixelStreamWriter.

Once again the source PixelBuffer is asked for its type through the source PixelBuffers GetNativeType method. In the preferred embodiment, CreateMatchingStreamers 324 then invokes the destination PixelBuffers's CreatePixelStreamWriter 326 on this format. Preferably, the CreatePixelStreamWriter 326 method returns a PixelStreamWriter that matches this type and the appropriate bundle attributes. In the preferred embodiment, CreateMatchingStreamers 324 then asks the source PixelBuffer to create a pixelsteamreader through the source's CreatePixelStreamReader 328 method.

Preferably, this pair of PixelStreamReaders, and PixelStreamWriters are then returned to TPixelBuffer::CopyImage. TPixelBuffer::CopyImage next invokes its StreamRectilinearRotatedPixelBlock 330 method. In the preferred embodiment, TPixelBuffer::StreamRectilinearRotatedPixelBlock 330 then repeatedly calls either the PixelStreamReader's GetRow 332 or GetColumnAsRow 332 method to fill a intermediate PixelBuffers, followed by calling the PixelStreamWriter's PutRow 334 method.

StreamScaledPixelBlock

Figure 25:
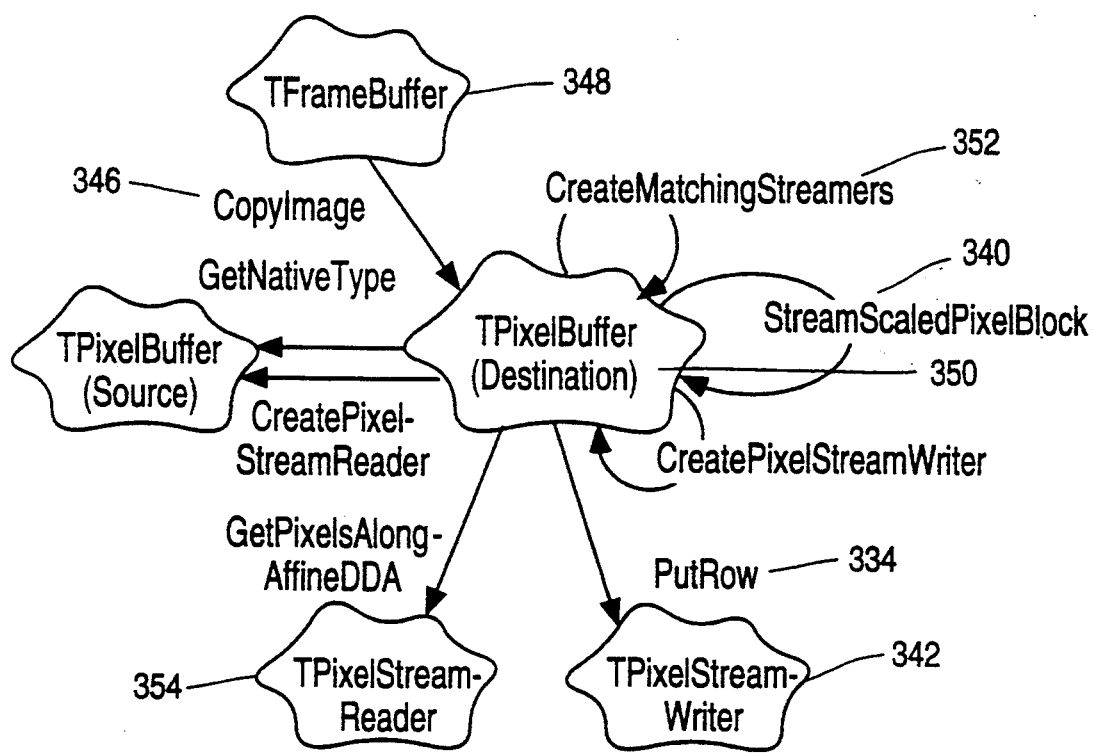
FIG. 25 is a illustrative example of the preferred use of StreamScaledPixelBlock for the present invention.

Referring now to FIG. 25, in the preferred embodiment, the StreamScaledPixelBlock 340 method calls the source PixelStreamReader's GetPixelsAlongAffineDDA method to place pixels into a temporary PixelBuffer. Preferably the destination PixelStreamWriter's 342 PutRow 344 method is used to write out the pixels. This allows for quick point sampled rectilinear-scaled transfers of pixel memory to and from the same type or those undergoing format conversions, transfer modes, and dithering. In the preferred embodiment, StreamScaledPixelBlock 340 can perform filtered transformations in the case where the source PixelBuffer is a MipMap or multiresolution pyramid.

As shown in FIG. 25, in the preferred embodiment, TPixelBuffer::CopyImage 346 is called by a TFrameBuffer 348 method. Preferably TPixelBuffer::CopyImage 346 then invokes its own CreateMatchingStreamers 352 method which then performs the same actions described in the above StreamRectilinearRotatedPixelBlock example. Preferably, once CreateMatchingStreamers 352 has returned a pair of PixelStreamReaders 354, and PixelStreamWriters 342 to TPixelBuffer::CopyImage 346, TPixelBuffer::CopyImage 346 invokes its StreamScaledPixelBlock 340 method. In the preferred embodiment, TPixelBuffer::StreamScaledPixelBlock 340 then repeatedly calls the PixelStreamReader's GetPixelsAlongAffineDDA method to fill an intermediate PixelBuffer, followed by calling the PixelStreamWriter's PutRow 344 method.

StreamAndFilterScaledPixelBlock

Figure 26:
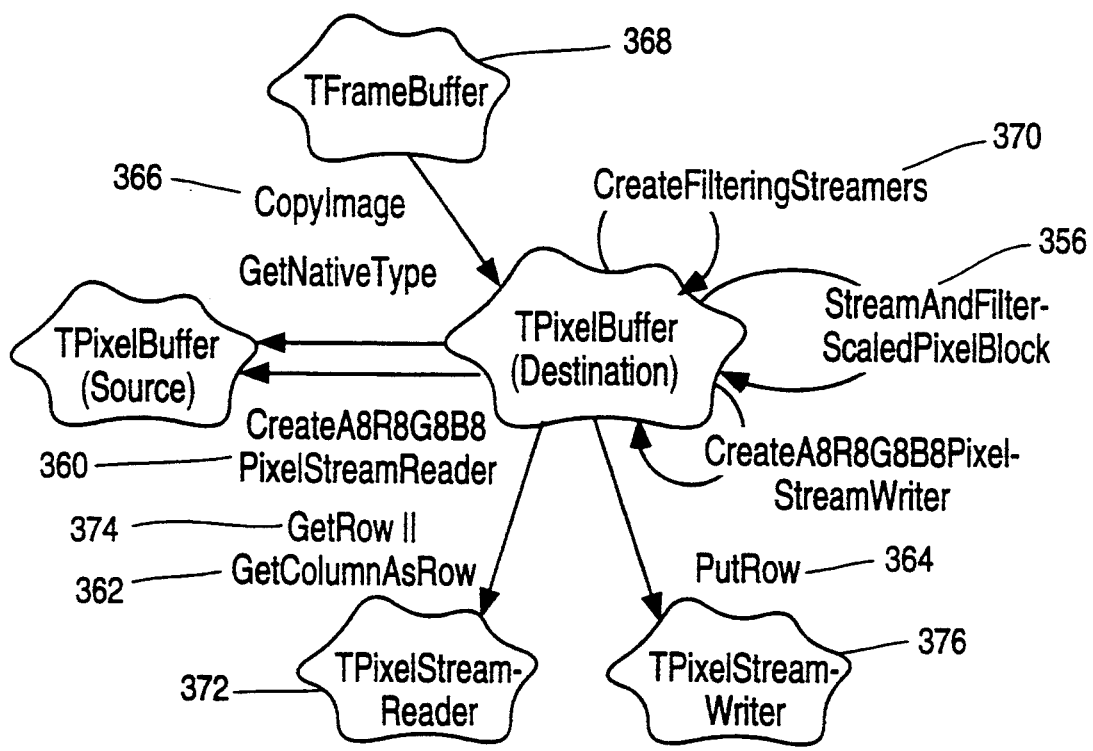
FIG. 26 is a illustrative example of the preferred use of StreamAndFilterScaledPixelBlock for the present invention.

Referring now to FIG. 26, in the preferred embodiment, the StreamAndFilterScaledPixelBlock 356 method polymorphically calls either the source PixelStreamReader's GetRow 360 or GetColumnAsRow 362 method to load the pixels into a A8R8G8B8 or Alpha8Gray8 format. Preferably, this pixel data is then filtered and summed to obtain output pixels. Preferably, when the filtering is complete for a output scanline, the destination PixelStreamWriter's PutRow 364 method is called to write out the pixels.

Preferably, PixelStreamWriter's PutRow 364 method employs an efficient two pass algorithm that reduces the number of convolution operations dramatically. In the preferred embodiment, the filter kernels used are the ones specified in the TImageSamplingControl attribute object from the TGrafBundle. This allows for efficiently filtered rectilinear scaled transfers of pixel memory to and from the same type or those undergoing format conversions, transfer modes, and dithering.

As shown in FIG. 26, in the preferred embodiment, TPixelBuffer: CopyImage 366 is called by a TFrameBuffer 368 method. TPixelBuffer::CopyImage 366 then invokes its own CreateFilteringStreamers 370 method which then performs the same actions as described in the StreamRectilinearRotatedPixelBlock example, except that only grayscale or RGB intermediate PixelBuffers will be used. Preferably, once CreateFilteringStreamers 370 has returned a pair of PixelStreamReaders, and PixelStreamWriters to TPixelBuffer::CopyImage 366, TPixelBuffer::CopyImage 366 invokes its StreamAndFilterScaledPixelBlock 356 method. In the preferred embodiment, TPixelBuffer:StreamAndFilterScaledPixelBlock then repeatedly calls either the PixelStreamReader's 372 GetRow 374, or GetColumnAsRow 362 methods to fill a intermediate pixelbuffer, followed by calling the PixelStreamWriter's 376 PutRow 364 method once a filtered scanline is prepared.

StreamPixelsIntoConvexPolygon

Figure 27:
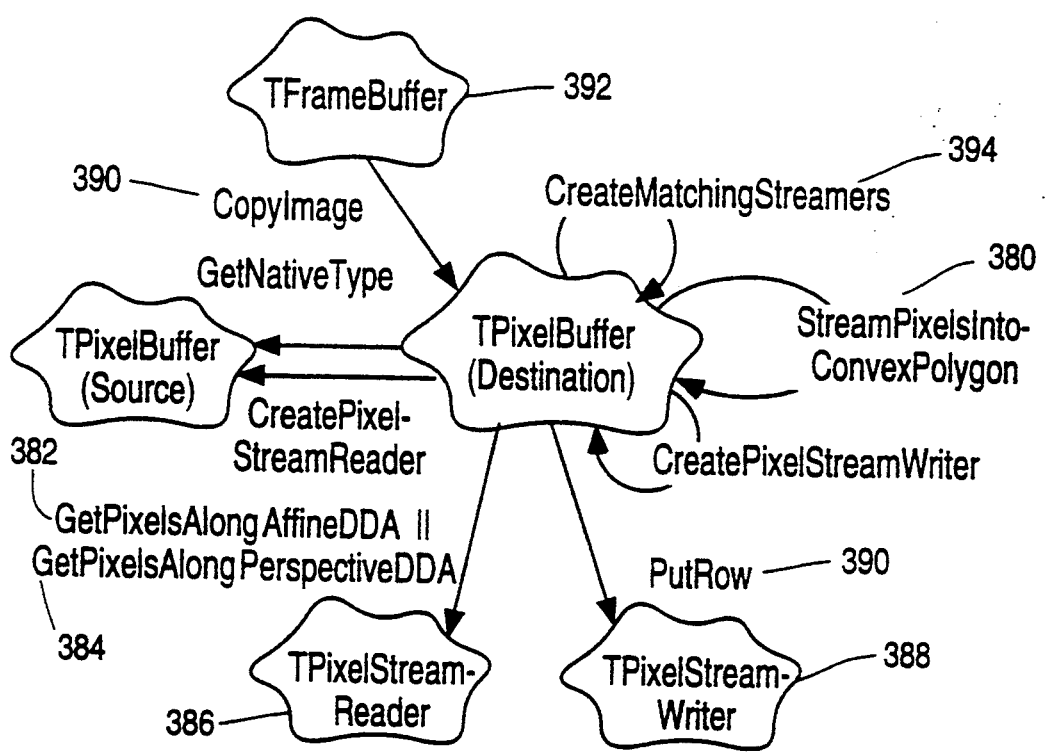
FIG. 27 is a illustrative example of the preferred use StreamPixelsIntoConvexPolygon for the present invention.

Referring now to FIG. 27, in the preferred embodiment, the StreamPixelsIntoConvexPolygon 380 scan converts a convex polygon interpolating x,y,u,v,w along the edges and for each span to be filled, calls either the source PixelStreamReader's 386 GetPixelsAlongAffineDDA 382 or GetPixelsAlongPerspectiveDDA 384 method to place pixels into a temporary PixelBuffer. Preferably, the destination PixelStreamWriter's 388 PutRow 390 method is used to write out the pixels. This allows for efficient point sampled rotated, skewed, scaled, or projective transfers of pixel memory to and from the same type or those undergoing format conversions, transfer modes, and dithering. In the preferred embodiment, StreamPixelsIntoConvexPolygon 380 can perform filtered transformations in the case where the source pixelbuffer is a MipMap or multiresolution pyramid.

As shown in FIG. 27, in the preferred embodiment, TPixelBuffer::CopyImage 390 is called by a TFrameBuffer 392 method. Preferably, TPixelBuffer:CopyImage 390 then invokes its own CreateMatchingStreamers 394 method which then performs the same actions as described in the above StreamRectilinearRotatedPixelBlock example. Preferably, once CreateMatchingStreamers 394 has returned a pair of PixelStreamReaders, and PixelStreamWriters to TPixelBuffer::CopyImage 390, TPixelBuffer::CopyImage 390 invokes its StreamPixelsIntoConvexPolygon 380 method. TPixelBuffer:StreamPixelsIntoConvexPolygon 380 then repeatedly calls either the PixelStreamReader's 386 GetPixelsAlongAffineDDA 382, or GetPixelsAlongPerspectiveDDA 384 method to fill a intermediate PixelBuffer, followed by calling the PixelStreamWriter's 388 PutRow 390 method.

StreamAndFilterPixelsIntoConvexPolygon

Figure 28:
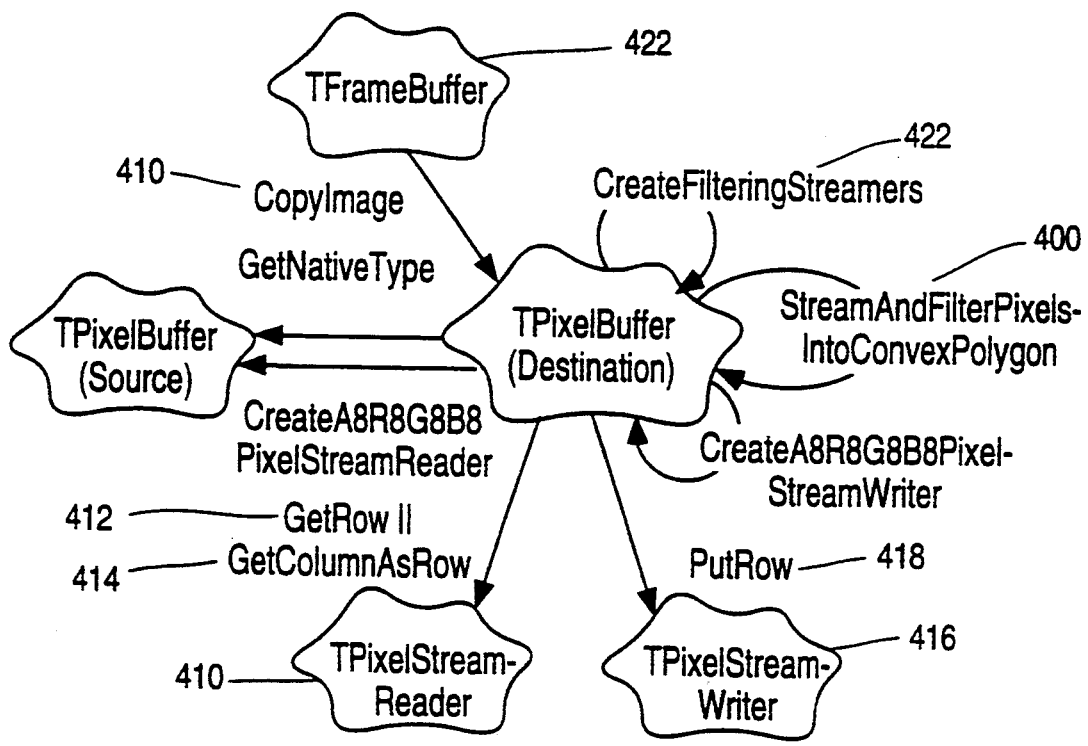
FIG. 28 is a illustrative example of the preferred StreamAndfilterPixelsIntoConvexPolygon for the present invention.

Referring now to FIG. 28, in the preferred embodiment, the StreamAndFilterPixelsIntoConvexPolygon 400 method performs a piecewise two-pass filtered transformation of the source PixelBuffer into the convex polygon in the destination. Preferring, the source PixelStreamReader's 410 GetRow 412 or GetColumnAsRow 414 method is called to load the pixels into a A8R8G8B8 or Alpha8Gray8 format. Preferably, this pixel data is then two-pass filtered and summed to obtain output pixels. When the filtering is complete for a output pixel block, the destination PixelStreamWriter's 416 PutRows 418 method is preferably called to write out the pixels. In the preferred embodiment, this PutRows 418 method employs an efficient piecewise two-pass algorithm that reduces the number of convolution operations dramatically. Preferably, this is accomplished by reducing the 2-Dimensional transformation into two 1-Dimensional scale and skew transformations. In the preferred embodiment, the filter kernels used are taken from the TImageSamplingControl attribute object from the TGrafBundle. This allows for efficient filtered rotated, skewed, scaled, or projective transfers of pixel memory to and from the same type or those undergoing format conversions, transfer modes, and dithering.

As shown in FIG. 28, in the preferred embodiment, TPixelBuffer::CopyImage 420 is called by a TFrameBuffer 422 method. TPixelBuffer::CopyImage 420 then invokes its own CreateFilteringStreamers 422 method which then performs the same actions as described in the above StreamRectilinearRotatedPixelBlock example except that only grayscale or RGB intermediate Pixelbuffers are used. Preferably, once CreateFilteringStreamers 422 has returned a pair of PixelStreamReaders and PixelStreamWriters to TPixelBuffer::CopyImage 420, TPixelBuffer::CopyImage 420 invokes its StreamAndFilterPixelsIntoConvexPolygon 400 method. In the preferred embodiment, TPixelBuffer::StreamAndFilterPixelsIntoConvex Polygon 400 then repeatedly calls either the PixelStreamReader's 410 GetRow 412, or GetColumnAsRow 414 methods to fill a intermediate pixelbuffer, and followed by calling the PixelStreamWriter's 416 PutRows 418 method once a filtered block has been two-pass transformed.

Polymorphic Queries

Preferably, the number of TPixelBuffer subclasses will grow with system use. In the preferred embodiment, to a client each subclass is merely a container of an undetermined number of attributes. Consider the case where clients have a polymorphic reference to a TPixelBuffer in the preferred embodiment. The need may arise for this client to determine whether specific attributes such as color, opacity, or Z-depth values are being stored. An image editing data encapsulator may wish to screen out images that do not contain color attributes. Preferably, a Z-buffer rendering pipeline creates a separate Z-plane if one is not present. In the preferred embodiment, a point containment test on a TGImage has to determine whether or not opacity is stored, and if so, whether the pixel in question is completely transparent.

What form should the solutions to all of the above needs take? While the name of the container is available through the MCollectible method GetClassNameAsToken, this is not the preferred method. Since the types of attributes are expanding, it is not preferable to create an exhaustive list of questions that can be imposed on PixelBuffers. Instead, a mechanism similar to a type negotiation proves to be much cleaner, extensible, and objects-oriented.

Figure 29:
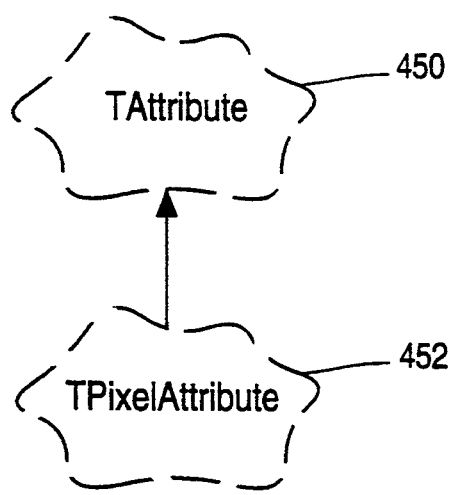
FIG. 29 is a illustrative example of the preferred polymorphic queries for the present invention.

Referring now to FIG. 29, in the preferred embodiment, high level descriptors of attributes are specified through TPixelAttributes 452. Preferably TPixelAttributes 452 are not intended to describe storage specifics. In the preferred embodiment, the method ContainsPixelAttribute enables PixelBuffers to answer as to whether or not they contain a specific attribute. Preferably, ContainsPixelField accepts a TPixelAttribute and returns a Boolean, true or false result. Alternatively, the GetPixelAttributes method enumerates all of the attributes contained within a specific PixelBuffer.

Preferably, GetPixelAttributes accepts a reference to a TDeque which when returned contains all the PixelAttributes that are stored by the PixelBuffer. In the preferred embodiment, many predefined TPixelAttributes are available to create a standard vocabulary for common attributes. Subclasses preferably supply these methods.

In the preferred embodiment, the primary users of PixelBuffers are TFramebuffer, TGImage, and TImageSequence. Preferably, PixelBuffers perform a dual function. They serve as a possible collection of read only pixels and as a collection of modifiable pixels. In the preferred embodiment, the method ArePixelsReadOnly is used to ask whether a PixelBuffer is modifiable and returns a Boolean, TRUE or FALSE answer. Preferably, a PixelBuffer is modifiable. In the preferred embodiment the system provides mechanisms to modify the pixel memory.

Polymorphic PixelBuffer Caches

In the preferred embodiment, the system provides methods which enable clients to create, maintain, and query PixelBuffer caches. These caches are preferably used by the sprite and cached graphic clients. These caches can also be used to blit rapidly into instances of the same subclass with similar runtime attributes.

Polymorphic Back Buffering/Correlated PixelBuffers

Preferably, additional methods enable clients to polymorphically create and maintain correlated PixelBuffers or "BackBuffers". Unlike the previously mentioned caches, in the preferred embodiment, there is a tight coupling between these backbuffers and this instance of the subclass.

TPixelBuffers Subclasses

As previously mentioned, there are numerous ways that to organize pixel memory. These include component interleaved, component planar, or bit planar, tiled, and hierarchical versions of the these. The list of possibilities is constantly expanding. In the preferred embodiment, the class hierarchy, takes in to account whether the subclass exposes the memory organization and whether access to the pixel data is private or public.

Pixel memory organization and storage

Subclasses are free to expose pixel organization but are not required to. In the preferred embodiment the power is derived not by hiding your implementation but rather by providing polymorphic access to a client's pixel storage. Moreover, clients of a subclass may depend on a particular implementation of the pixel memory. For example, a card with a hardware look up table programmed to utilize 8-bit pointers and would not appreciate a redefinition of the Clut8 PixelBuffers memory organization. His 8-bit pointers may be rendered useless.

If a subclass does not export its pixel memory organization to others, it is difficult if not impossible for external clients to extend the subclass' arsenal of painters and pixelstreamers. This depends upon the subclass. Some subclasses derive their power from hiding the implementation. Others may keep the memory layout public and access private to prevent a client from setting the pixel values to some incorrect state.

Preferred Subclasses

Figure 30:
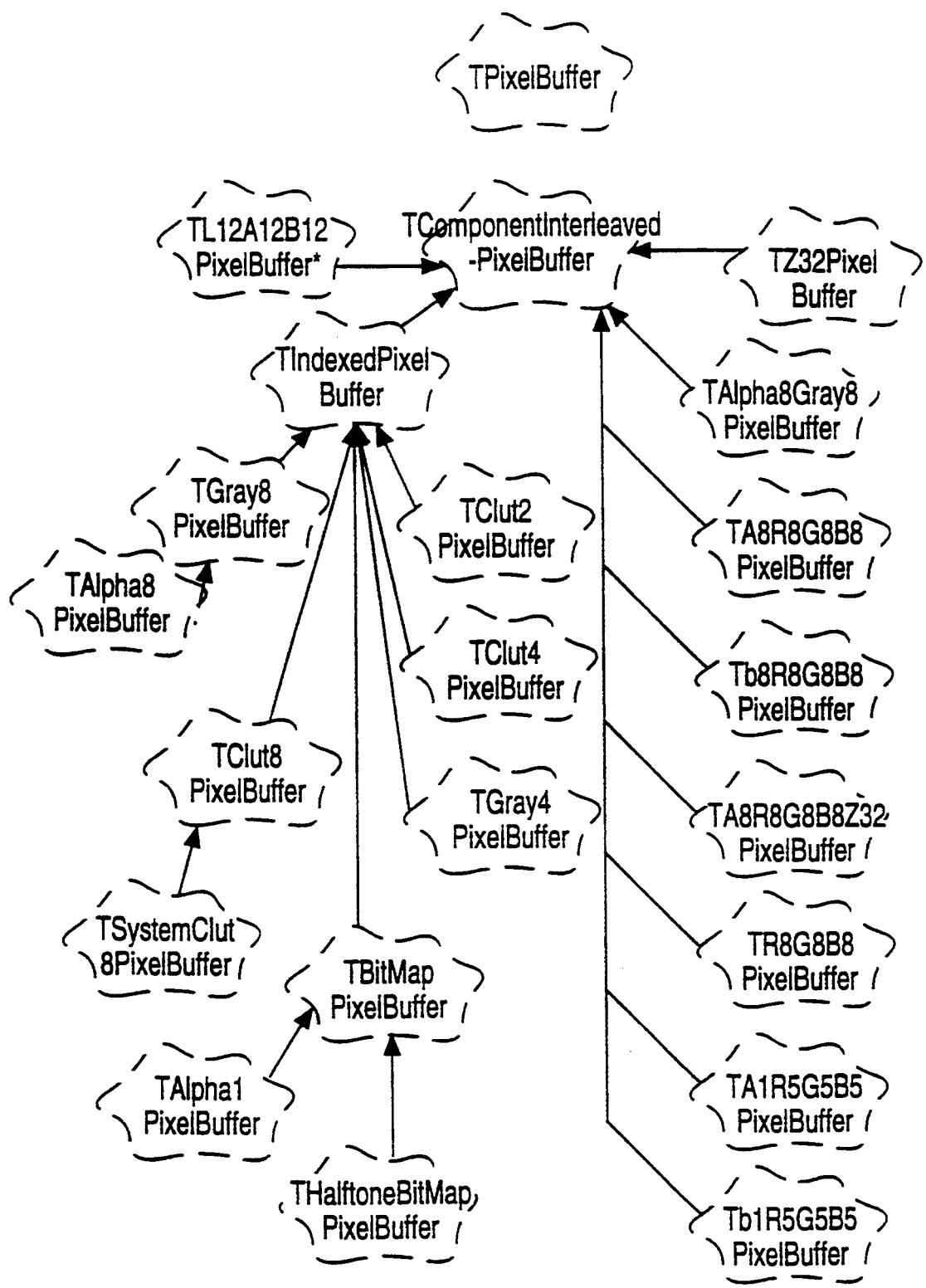
FIG. 30 is a illustrative example of the preferred PixelBuffer Class Hierarchy for the present invention.

In the preferred embodiment, numerous image formats are selected for support. The selection process was were driven by the need to support current video card standards, exchange formats, unintelligent bilevel printers, 3-Dimensional rendering, color matching, and 2-Dimensional image composition. In the preferred embodiment, all subclasses initially have component interleaved memory organization. In the preferred embodiment, TComponentInterleavedPixelBuffer is a subclass of TPixelBuffer. Preferably, all PixelBuffers are derived from TPixelBuffers. FIG. 30 is a class hierarchy diagram which demonstrates the TPixelBuffer class lineage.

TComponentInterleavedPixelBuffers

Figure 32:
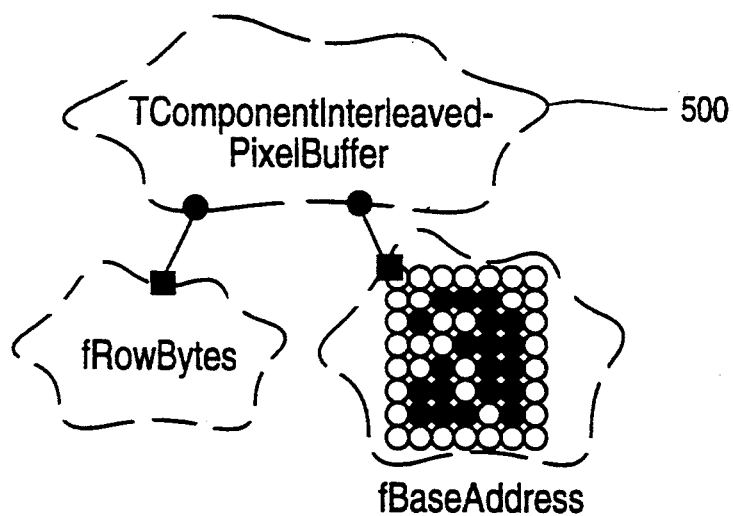
FIG. 32 is a illustrative example of the preferred TComponentInterleavedPixelBuffer for the present invention.

Referring now to FIG. 32, in the preferred embodiment, TComponentInterleavedPixelBuffer 500 is a subclass of TPixelBuffer that provides base level support for the specification of a component interleaved or chunky pixelbuffer. Preferably, the new ingredients it adds are a sole pointer to pixel memory, and a scanline size specified as a multiple of 4 bytes.

In the preferred embodiment, a subclass adds GetPixelSize as a pure virtual method, which is preferably overridden by subclasses. Preferably, a subclass provides a default implementation of the MovePixelBlock methods. Thus, in the preferred embodiment, the GetBestScanlineSize method is made available to clients when allocating their own pixel memory. Preferably the size returned is optimized for the platform, with the caveat that the result is a multiple of 4.

Preferably, the pixelbuffer disposes of its pixel memory upon deletion if the memory was allocated by the PixelBuffer and not passed in the constructor. This allows for a framebuffer to be mapped in. In the preferred embodiment the pointer to the start of pixel memory can be acquired through the GetBaseAddress method and the scanline size can be acquired through the GetScanlineSize method.

TA8R8G8B8PixelBuffer

Figure 33:
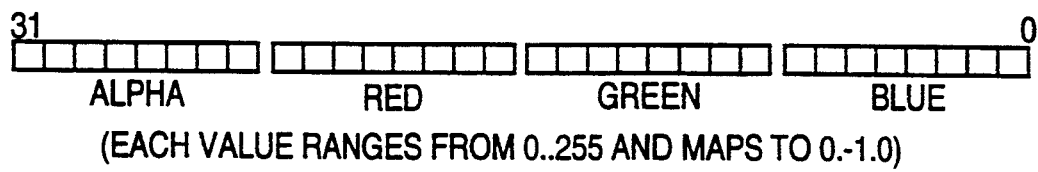
FIG. 33 is a illustrative example of the preferred TA8R8G8B8PixelBuffer for the present invention.

Referring now to FIG. 33, in the preferred embodiment, TA8R8G8B8PixelBuffer is a container for 32-bit pixels which comprise four 8-bit components. These components are preferably alpha, red, green, and blue as shown in FIG. 33. The red, green, and blue components form a coordinate in an RGB space. Preferably, the PixelBuffers's TColorProfile method derives an XYZcolor from this RGB triplet. In the preferred embodiment the alpha component specifies opacity. Preferably the color components are not preweighted by the alpha value. In the preferred embodiment, it is considered to contain the kRGBPixelField, kAlphaPixelField, and kColorPixelField pixel fields. (This and the following descriptions of pixel memory organizations are presented in terms of how the pixel layout appears to a high level language in the preferred embodiment.)

TL12A12B12PixelBuffer

Preferably CIElab is the discretized colorspace for storing most if not all of the visible spectrum. CIElab components are preferably nonlinearly mapped into 8 or 12 bits values.

TAlpha8Gray8PixelBuffer

Figure 34:
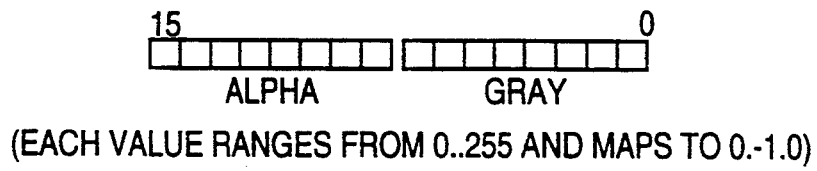
FIG. 34 is a illustrative example of the preferred TAlpha8Gray8PixelBuffer for the present invention.

Referring now to FIG. 34, in the preferred embodiment, TAlpha8Gray8PixelBuffers is a container for 16-bit pixels which contain two 8-bit components. Preferably, these components comprise alpha and gray. In the preferred embodiment the gray component forms a coordinate in luminance space. Preferably, PixelBuffer's TColorProfile derives an XYZcolor from this gray value. Preferably the alpha component specifies opacity. In the preferred embodiment the gray component is not preweighted by the alpha value. It is considered to contain the kGrayscalePixelField, kAlphaPixelField, and kColorPixelField pixel fields in the preferred embodiment.

TIndexedPixelBuffers

Figure 35:
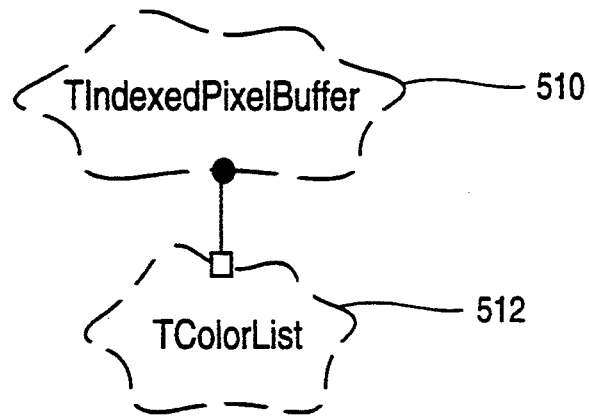
FIG. 35 is a illustrative example of the preferred TIndexedPixelBuffer for the present invention.

As shown on FIG. 35, in the preferred embodiment, TIndexedPixelBuffers 510 is a abstract base class container for pixels which contain one component. Preferably this component is an index into the TColorList 512 of the PixelBuffer. Preferably, to derive an XYZcolor from this index, it calls the GetColor method of the TColorList 512 with the index and a reference to a TXYZColor. In the preferred embodiment TColorProfile of the TColorList 512 is identical to the one referenced by the PixelBuffer. To map a TColor into the appropriate index, preferably TColorsFindIndex method is called with colorlist as an argument.

TIndexedPixelBuffer 510 preferably stores a reference to a TColorList. In the preferred embodiment the colorlist can be accessed through the GetColorList method. TColorLists with 2 through 256 colors are preferably handled through subclasses.

TClut2PixelBuffer

As shown in FIG. 36, in the preferred embodiment, TClut2PixelBuffer is a container for pixels which contain one 2-bit component. This component is an index into the TColorList of the PixelBuffers. Preferably, TColorList contains 4 color entries. Preferably, it contains the kRGBPixelField1 and kColorPixelField pixelfields.

TClut4PixelBuffer

As shown in FIG. 37, in the preferred embodiment, TClut4PixelBuffer is a container for pixels which contain one 4-bit component. This component is an index into the TColorList of the pixelbuffer. Preferably, TColorList contains 16 color entries. In the preferred embodiment, it contains the kRGBPixelField, and kColorPixelField pixelfields.

TClut8PixelBuffer

As shown in FIG. 38, in the preferred embodiment, TClut8PixelBuffer is a container for pixels which contain one 8-bit component. This component is an index into the TColorList of the PixelBuffer. Preferably, TColorList contains 256 color entries. It is considered to contain the kRGBPixelField, and kColorPixelField pixelfields.

TSystemClut8PixelBuffer

In the preferred embodiment, TSystemClut8PixelBuffer is a subclass of TClut8PixelBuffer. While the pixels still represent 8-bit indices into the color list, the color list the fixed default color list in the preferred embodiment. This allows for assumptions to be made when converting a TColor into the proper index. TSystemClut8PixelBuffer's painters and pixelstreamers can make use of these assumptions to improve performance.

TGray4PixelBuffer

Figure 39:
FIG. 39 is a illustrative example of the preferred TGray4PixelBuffer for the present invention.

As shown in FIG. 39, in the preferred embodiment, TGray4PixelBuffer is a container for pixels which contain one 4-bit component. This component is an index into the TGrayColorList of the PixelBuffer. The TGrayColorList is a fixed ramp of 16 gray colors from white to black. It is considered to contain the kGrayscalePixelField, and kColorPixelField pixelfields.

TGray8PixelBuffer

Figure 40:
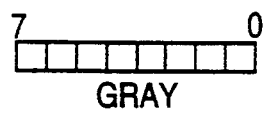
FIG. 40 is a illustrative example of the preferred TGray8PixelBuffer for the present invention.

As shown in FIG. 40, in the preferred embodiment, TGray8PixelBuffer is a container for pixels which contain one 8-bit component. This component is an index into the PixelBuffer's TGrayColorList. Preferably, TGrayColorList is a fixed ramp of 256 gray colors from white to black. In the preferred embodiment, it contains the kGrayscalePixelField1 and kColorPixelField pixel fields.

TAlpha8PixelBuffer

Figure 41:
FIG. 41 is a illustrative example of the preferred TAlpha8PixelBuffer for the present invention.

Referring now to FIG. 41, in the preferred embodiment, TAlpha8PixelBuffer is a subclass of TGray8PixelBuffer, the only difference being that the gray values specify opacity instead of luminance. Preferably, it contains the kAlphaPixelField PixelField.

TBitMappedPixelBuffer

As shown in FIG. 42, in the preferred embodiment, TBitmappedPixelBuffer is a container for pixels which contain one bit component. This component is an index into the TGrayColorList of the pixelbuffer. The TGrayColorList contains only two gray values, which are black, and white. Preferably, it contains the kGrayscalePixelField, and kColorPixelField pixel fields.

THalftonedBitmappedPixelBuffer

Referring now to FIG. 43, in the preferred embodiment, THalftonedBitmappedPixelBuffer is a subclass of TBitmappedPixelBuffer. The only difference being that the gray values derived from an incoming TColor are preferably thresholded against the periodic pattern specified by its THalftone object. This THalftone object can be retrieved through the GetHalftone method. It can be set through the SetHalftone method. The periodic threshold pattern is stored in the halftone matrix referenced in the fThresholdArray field. Preferably, this is the subclass used by unintelligent bilevel printers.

TAlpha1 PixelBuffer

Referring now to FIG. 44, in the preferred embodiment, TAlpha1PixelBuffer is a subclass of TBitmappedPixelBuffer. The only difference being that the gray values specify opacity instead of luminance. Preferably, it contains the kAlphaPixelField Pixel Field.

Tb8R8G8B8PixelBuffer

Referring now to FIG. 45, in the preferred embodiment, Tb8R8G8B8PixelBuffer is a container for 32 bit pixels which contain four 8-bit components. Preferably, the uppermost component is undefined and the remaining components are red, green, and blue. The red, green, and blue components are form a coordinate in an RGB space. Preferably the TColorProfile of the PixelBuffer is used to derive an XYZcolor from this RGB triplet. This PixelBuffer is very useful for representing video cards that, while appearing to support 32-bit pixels, do not have the physical memory to store the uppermost byte. Preferably, it contains the kRGBPixelField, and kColorPixelField pixelfields.

TZ32PixelBuffer

As shown in FIG. 46, in the preferred embodiment, TZ32PixelBuffer is a container for 32-bit pixels which contains one 32-bit component, which represents Z-depth. The Z-depth value specifies the 3-Dimensional depth or layer of the pixel. Quite often individual 3-Dimensional objects are rendered into separate TPixelBuffers. In the preferred embodiment, the z-depth value enables these individual PixelBuffers to be assembled into a final scene that accurately reflects the front to back ordering of the individual objects. Preferably, it contains the kZDepthPixelField PixelField.

TA8R8G8B8Z32PixelBuffer

Figure 47:
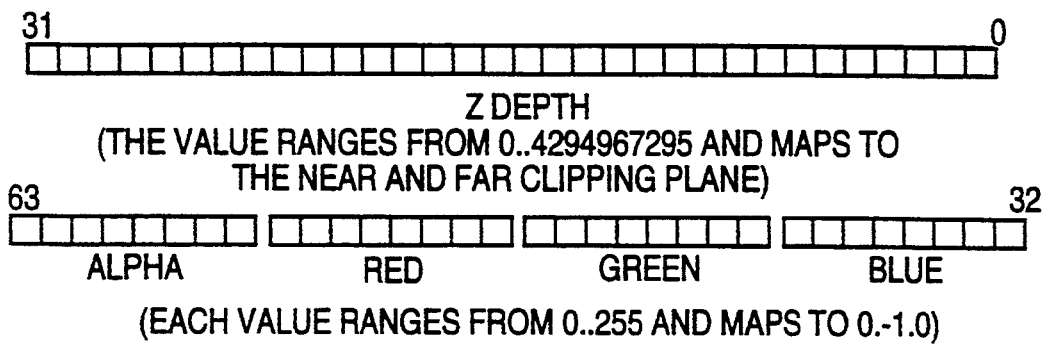
FIG. 47 a illustrative example of the preferred TA8R8G8B8Z32PixelBuffer for the present invention.

As shown in FIG. 47, in the preferred embodiment TA8MG8B8232PixelBuffer is a container for 64-bit pixels which contain one 32-bit component and four 8-bit components. These components are Z-depth, alpha, red, green, and blue. The red, green, and blue components form a coordinate in an RGB space. Preferably, the TColorProfile of the PixelBuffer derives an XYZcolor from this RGB triplet. In the preferred embodiment, the alpha component specifies opacity. Preferably, the color components are not preweighted by the alpha value.

In the preferred embodiment, the Z-depth value specifies the 3-Dimensional depth or layer of the pixel. Preferably, individual 3-Dimensional objects are often rendered into separate TA8R8G8B8Z32PixelBuffers. The Z-depth value enables these individual PixelBuffers to be assembled into a final scene that accurately reflects the front to back ordering of the individual objects. Preferably, it contains the kRGBPixelField, kAlphaPixelField, kZDepthPixelField, and kColorPixelField pixelfields.

TA1R5G5B5PixelBuffer

Figure 48:
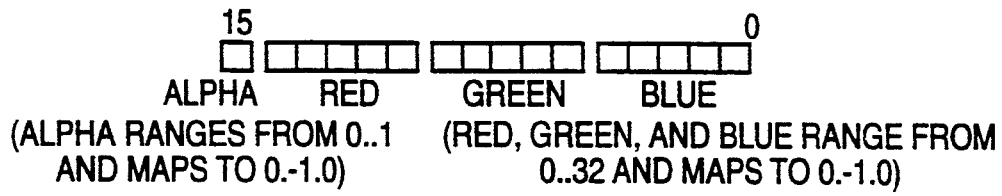
FIG. 48 is a illustrative example of the preferred TA1R5 TA 1R5G5B5PixelBuffer for the present invention.

As shown in FIG. 48, in the preferred embodiment, TA1R5G5B5PixelBuffer is a container for 16-bit pixels which contain one 1-bit component, and three 5-bit components. These components are alpha, red, green, and blue. The red, green, and blue components form a coordinate in an RGB space. To derive an XYZcolor from this RGB triplet, it is necessary to use the TColorProfile of the pixelbuffer. The alpha component specifies opacity. The color components are not preweighted by the alpha value. It contains the kRGBPixelField, kAlphaPixelField, and kColorPixelField pixel fields.

Tb1R5G5B5Pixel Buffer

Figure 49:
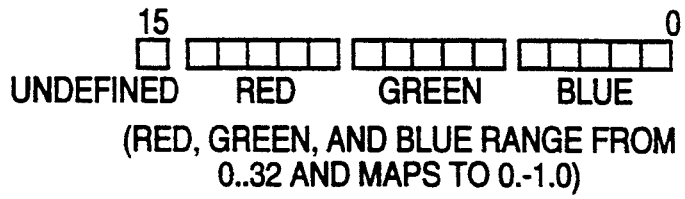
FIG. 49 is a illustrative example of the preferred TB1R5G5BPixelBuffer for the present invention.

As shown in FIG. 49, in the preferred embodiment, Tb1R5G5B5PixelBuffer is a container for 16-bit pixels which comprise one 1-bit component, and three 5-bit components. The uppermost component is undefined. The remaining components are red, green and blue. The red, green, and blue components form a coordinate in an RGB space. To derive an XYZcolor from this RGB triplet, it is necessary to use the TColorProfile of the PixelBuffer. Preferably, it contains the kRGBPixelField, and kColorPixelField pixel fields.

TR8G8B8PixelBuffer

Figure 50:
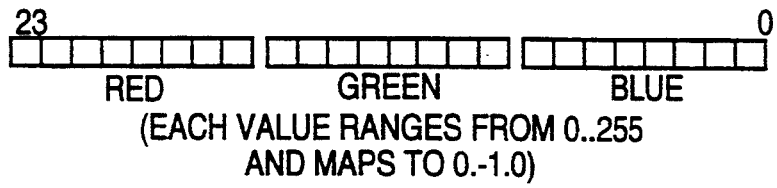
FIG. 50 is a illustrative example of the preferred TR8G8B8PixelBuffer for the present invention.

In the preferred embodiment, as shown in FIG. 50, TR8G8B8PixelBuffer is a container for 24-bit pixels which contain three 8-bit components. The uppermost component is undefined. The remaining components are Red, Green, and Blue. The red, green, and blue components form a coordinate in an RGB space. To derive an XYZcolor from this RGB triplet, it is necessary to use the TColorProfile of the PixelBuffer. This PixelBuffer is more efficient in terms of storage for representing opaque RGB images. Preferably, it is considered to contain the kRGBPixelField, and kColorPixelField pixelfields.

Subclassing TPixelBuffer

In the preferred embodiment, additional PixelBuffer subclasses can be created for supporting device specific color models such as CMYK requires new subclasses or for image editors to add component interleaved tiler, or component planar PixelBuffer subclasses to leverage locality of reference. Additionally hardware platform vendors can reduce video ram requirements without sacrificing quality by writing a TYUVPixelBuffers which can reproduce true color images at 12–16 bits per pixel. A video effects card vendor can now integrate its card into the graphics system and desktop. Preferably a video feed coming over the network can be quickly integrated into the desktop through a TPixelBuffers, and TGImage subclass.

The undue complexity involve in supporting a reorganized pixel memory proves can be prohibitive in conventional systems. For example, Apple's QuickDraw32 took nearly a year to add support for 16-bit and 32-bit pixel maps. Inordinate effort can be expended getting the first filled rectangle up on such a device. In the preferred embodiment, subclassers of TPixelBuffer need only override the Set and GetPixel methods to get default rendering behavior. The CreatePainter, and CreatePixelStreamer methods of TPixelBuffer have some generic painters and pixelstreamers that rely on the virtual Get and SetPixel methods. TPixelBuffer's MovePixelBlock method also provides an implementation based on Set and GetPixel. While this default behavior may not provide the optimal performance needed for a shipping product, it creates a incremental model for developmental purposes.

Preferably, once the new pixelbuffer subclass has it own arsenal of painters and pixelstreamers, it might prove worthwhile to write PixelStreamWriters that understand the subclass' pixel memory for other common Pixelbuffers. Preferably this mechanism allows a third party to develop a new PixelBuffer subclass such as TMPEGPixelBuffer that is not required to convert pixels into some common formats before transferring them to a screen device.

TPixelBuffer/TGImage

Figure 51:
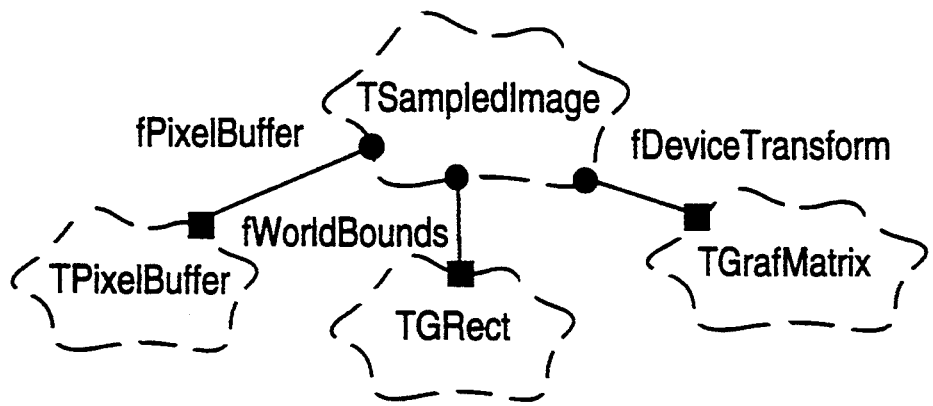
FIG. 51 is a illustrative example of the preferred TGImage for the present invention.

Referring now to FIG. 51, in the preferred embodiment, as the encapsulator of pixel memory, TPixelBuffers serves a dual purpose. TPixelBuffers is a rendering destination object as well as an object used as a drawing primitive, typically called an image. In the preferred embodiment, a TPixelBuffers may not contain all of the preferred ingredients for fully describing an image primitive.

Preferably TGImage is the class which obviates the need to expose TPixelBuffers at the TGrafPort level. TGImage also contains the additional ingredients required during rendering. TGImage preferably contains a TPixelBuffers, a TGRect bounding rectangle, and a device transform. This is the preferred embodiment's geometric equivalent of an image primitive.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for polymorphically managing pixel data comprising:
an object-oriented operating system for interfacing with a user;
a data processor controlled by the operating system;
display device controlled by the data processor for displaying a plurality of pixels to form a graphic image, each of the plurality of pixels having pixel data for controlling the display device to display an appearance for each of the plurality of pixels;
storage means with a plurality of locations for storing the pixel data;
an array having cells representing a plurality of pixels which display in a contiguous region on the display device;
a reference to selected ones of the plurality of locations, the selected ones corresponding to pixels represented by the array;
an attribute stored in the storage means and specifying an encoding format for display on the display device and applicable to each of the pixels represented by the array; and
means responsive to the stored attribute for creating a painter object which modifies pixel data in the selected ones of the plurality of locations in order to change the appearance of the plurality of pixels in a predetermined manner based on the stored attribute.

2. The apparatus of claim 1 including means controlled by the user for querying, the storage means to retrieve the stored attribute.

3. The apparatus of claim 1 including object editing means controlled by the user for adding additional pixel data attributes into the storage means.

4. The apparatus of claim 3 further comprising means controlled by the user and created by the painter object creation means in response to the attribute for manipulating pixel data in a subset of the selected ones of the plurality of locations in accordance with a predetermined process.

5. The apparatus of claim 3 further comprising means controlled by the user and created by the painter object creation means in response to the attribute for retrieving pixel data from only one of the selected ones of the plurality of locations.

6. The apparatus of claim 3 further comprising means controlled by the user and created by the painter object creation means in response to the attribute for manipulating pixel data in only one of the selected ones of the plurality of locations in accordance with a predetermined process.

7. The apparatus of claim 3 further comprising means controlled by the user and created by the painter object creation means in response to the attribute for moving pixel data in a contiguous block of selected ones of the plurality of locations from one set of said plurality of storage locations to another set of the plurality of storage locations.

8. The apparatus of claim 3 further comprising means controlled by the user and created by the painter object creation means in response to the attribute for copying pixel data in a contiguous block of selected ones of the plurality of locations from one set of said plurality of storage locations to another set of the plurality of storage locations.

9. The apparatus of claim 3 further comprising means controlled by the user and created by the painter object creation means in response to the attribute for storing a copy of the plurality of locations in the storage means.

10. The apparatus of claim 3 wherein the apparatus further comprises an additional storage means and means controlled by the user and created by the painter object creation means in response to the attribute for transferring pixel data from the storage means to the additional storage means.

11. The apparatus of claim 3 wherein the additional pixel data attributes include an active boundary attribute which specifies a subset of the array which can be changed.

12. The apparatus of claim 11 wherein the additional pixel data attributes include a reference resolution specification indicating a number of pixels included in the array.

13. The apparatus of claim 11 wherein the additional data attributes includes a reference orientation indicating a rotation to be applied to the array.

14. The apparatus of claim 3 wherein the additional data attributes includes transformation means for assigning a location in continuous coordinates to one of the array cells.

15. The apparatus of claim 3 further comprising a colormetric characterization object containing a plurality of color specifications and a method for assigning one of the plurality of color specifications to each of the array cells.

16. In a computer system having an object-oriented operating system for interfacing with a user, a data processor controlled by the operating system, a display device controlled by the data processor for displaying a plurality of pixels to form a graphic image, each of the plurality of pixels having pixel data for controlling the display device to display an appearance for each of the plurality of pixels and storage means with a plurality of locations for storing the pixel data, a method for polymorphically managing the pixel data, the method comprising the steps of:

A. creating an array with cells representing a plurality of pixels which display in a contiguous region on the display device;

B. creating a reference between the array cells and selected ones of the plurality of locations, the selected ones corresponding to pixels represented by the array;

C. selecting an attribute from a plurality of attributes and storing the selected attribute, each attribute specifying an encoding format for displaying each of the pixels represented by the array on the display device;

D. modifying pixel data in the selected ones of the plurality of locations in order to change the appearance of the plurality of pixels in a predetermined manner and in response to the attribute selected in step C; and E. creating a polymorphic painter object which modifies pixel data in response to the color attribute selected in step C.

17. The method of claim 1 including the step of:
F. retrieving the stored attribute from the storage means.

18. The method of claim 1 including the step of:
G. storing additional pixel data attributes into the storage means.

19. The method of claim 18 wherein step G comprises the step of:
G1. adding an active boundary attribute which specifies a subset of the array which can be changed.

20. The method of claim 18 wherein step G comprises the step of:
G2. adding a reference resolution specification indicating a number of pixels included in the array.

21. The method of claim 18 wherein step G comprises the step of:
G3. adding a reference orientation indicating a rotation to be applied to the array.

22. The method of claim 18 wherein step G comprises the step of:
G4. assigning a location in continuous coordinates to one of the array cells.

23. The method of claim 18 wherein step E comprises the step of:
E8. creating a colormetric characterization object containing a plurality of color specifications; and
E9. assigning one of the plurality of color specifications to each of the array cells.

24. The method of claim 1 wherein step E comprises the step of:
E1. manipulating pixel data in a subset of the selected ones of the plurality of locations in accordance with a predetermined process in response to the selected attribute.

25. The method of claim 1 wherein step E further comprises the step of:
E2. retrieving pixel data from only one of the selected ones of the plurality of locations in response to the selected attribute.

26. The method of claim 1 wherein step E further comprises the step of:
E3. manipulating pixel data in only one of the selected ones of the plurality of locations in accordance with a predetermined process in response to the selected attribute.

27. The method of claim 1 wherein step E further comprises the step of:
E4. moving pixel data in a contiguous block of selected ones of the plurality of locations from one set of said plurality of storage locations to another set of the plurality of storage locations in response to the selected attribute.

28. The method of claim 1 wherein step E further comprises the step of:
E5. copying pixel data in a contiguous block of selected ones of the plurality of locations from one set of said plurality of storage locations to another set of the plurality of storage locations in response to the selected attribute.

29. The method of claim 1 wherein step E further comprises the step of:
E6. storing a copy of the plurality of locations in the storage means in response to the selected attribute.

30. The method of claim 1 wherein the computer apparatus further comprises an additional storage means and the method further comprises the step of:
E7. transferring pixel data from the storage means to the additional storage means in response to the selected attribute.

* * * * *